United States Patent
Dinan

(10) Patent No.: US 10,659,208 B2
(45) Date of Patent: *May 19, 2020

(54) TRANSMISSION OF SOUNDING REFERENCE SIGNAL IN MULTI-SUBFRAME GRANT

(71) Applicant: Ofinno Technologies, LLC, Herndon, VA (US)

(72) Inventor: Esmael Dinan, McLean, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/247,902

(22) Filed: Jan. 15, 2019

(65) Prior Publication Data

US 2019/0165909 A1     May 30, 2019

Related U.S. Application Data

(63) Continuation of application No. 15/422,452, filed on Feb. 1, 2017, now Pat. No. 10,187,187.

(60) Provisional application No. 62/289,800, filed on Feb. 1, 2016, provisional application No. 62/314,676, filed on Mar. 29, 2016.

(51) Int. Cl.
| | |
|---|---|
| *H04L 5/00* | (2006.01) |
| *H04L 1/00* | (2006.01) |
| *H04L 27/00* | (2006.01) |

(52) U.S. Cl.
CPC .......... *H04L 5/0048* (2013.01); *H04L 1/0004* (2013.01); *H04L 5/001* (2013.01); *H04L 27/0006* (2013.01)

(58) Field of Classification Search
CPC ..... H04L 5/0048; H04L 1/0004; H04L 5/001; H04L 27/0006
See application file for complete search history.

(56) References Cited

U.S. PATENT DOCUMENTS

| | | |
|---|---|---|
| 2012/0281604 A1 | 11/2012 | Papasakellariou et al. |
| 2013/0077574 A1 | 3/2013 | Ekpenyong et al. |
| 2013/0156014 A1* | 6/2013 | Kim ...................... H04L 5/0051 370/336 |

(Continued)

FOREIGN PATENT DOCUMENTS

WO     2016123402 A1     8/2016

OTHER PUBLICATIONS

3GPP TSG RAN WG1 #80 R1-150359 Athens, Greece, Feb. 9-13, 2015, Source: Samsung, Title: Enhancements to DL control signaling for CA with up to 32 CCs.

(Continued)

*Primary Examiner* — Duc C Ho
(74) *Attorney, Agent, or Firm* — David Grossman; Kavon Nasabzadeh; Philip Smith

(57) ABSTRACT

A wireless device receives a radio resource control (RRC) message comprising an aperiodic sounding reference signal (SRS) subframe parameter. The wireless device receives a downlink control information (DCI) triggering an SRS transmission and indicating uplink resources in consecutive subframes. The wireless device determines a position of a subframe in the consecutive subframes based on the aperiodic SRS subframe parameter. The wireless device transmits the SRS via the subframe.

20 Claims, 23 Drawing Sheets

(56) References Cited

U.S. PATENT DOCUMENTS

| | | | |
|---|---|---|---|
| 2013/0250847 A1* | 9/2013 | Lee | H04L 5/0051 370/315 |
| 2013/0294400 A1 | 11/2013 | Liu | |
| 2015/0319718 A1* | 11/2015 | Yang | H04W 76/15 370/252 |
| 2015/0341921 A1 | 11/2015 | Chen et al. | |
| 2016/0050667 A1* | 2/2016 | Papasakellariou | H04L 5/0053 370/329 |
| 2016/0065332 A1 | 3/2016 | Yum et al. | |
| 2016/0087771 A1 | 3/2016 | Noh et al. | |
| 2016/0095114 A1 | 3/2016 | Kim et al. | |
| 2016/0112960 A1 | 4/2016 | Park et al. | |
| 2016/0112992 A1 | 4/2016 | Bhushan et al. | |
| 2016/0113004 A1 | 4/2016 | Yu et al. | |
| 2016/0295345 A1 | 10/2016 | Oh | |
| 2016/0345206 A1 | 11/2016 | Yerramalli et al. | |
| 2017/0290040 A1 | 10/2017 | Dinan | |
| 2017/0347322 A1 | 11/2017 | Lee et al. | |
| 2017/0374679 A1* | 12/2017 | Park | H04L 5/00 |
| 2018/0048498 A1* | 2/2018 | Stern-Berkowitz | H04L 5/0048 |

OTHER PUBLICATIONS

3GPP TSG RAN WG1 meeting #80 R1-151500, Belgrade, Serbia, Apr. 20-24, 2015, Source: LG Electronics, Title: DL control enhancements for gupporting Rel-13 CA.

3GPP TSG RAN WG1 #80 R1-151603 Belgrade, Serbia, Apr. 20-24, 2015, Source: Samsung, Title: Other DL control enhancements for CA with up to 32 CCs.

3GPP TSG RAN WG1 meeting #81 R1-152713, Fukuoka, Japan, May 25-29, 2015, Source: LG Electronics, Title: DL control enhancement for Rel-13 CA.

3GPP TSG RAN WG1 meeting #81 R1-152741, Fukuoka, Japan, May 25-29, 2015, Source: LG Electronics, Title: Scheduling and HARQ operation in LAA.

3GPP TSG-RAN WG1 meeting #81 R1-152820, Fukuoka, Japan, May 25-29, 2015, Source: Nokia Networks, Title: On reducing the number of DL control blind decodes.

3GPP TSG RAN WG1 #81 R1-152849, Fukuoka, Japan, May 25-29, 2015, Source: Samsung, Title: Other DL control enhancements for CA with up to 32 CCs.

3GPP TSG RAN WG1 meeting #81 R1-152990, Fukuoka, Japan, May 25-29, 2015, Source: Alcatel-Lucent Shanghai Bell, Alcatel-Lucent, Title: LBT and Frame Structure Design for LAA with DL and UL.

3GPP TSG RAN WG1 meeting #84 R1-160299, St. Julian's, Malta, Feb. 15-19, 2016, Source: Huawei, HiSilicon, Title: Scheduling design for eLAA.

3GPP TSG RAN WG1 meeting #84 R1-160331, St Julian's, Malta, Feb. 15-19, 2016, Source: ZTE, Title: Discussion on UL Scheduling for LAA.

3GPP TSG RAN WG1 meeting #84 R1-160389, St Julian's, Malta, Feb. 15-19, 2016, Source: NEC, Title: Discussion on LAA UL scheduling.

3GPP TSG RAN WG1 meeting #84 R1-160489, St Julian's, Malta, Feb. 15-19, 2016, Source: Fujitsu, Title: UL LBT and PUSCH Design for LAA.

3GPP TSG RAN WG1 meeting #84, R1-160495, St Julian's, Malta, Feb. 15-19, 2016, Source: CMCC, Title: Discussion on issues related to PUSCH transmission for LAA.

3GPP TSG RAN WG1 meeting #84 R1-160557, St Julian's, Malta, Feb. 15-19, 2016, Source: Samsung, Title: Discussion on multi-subframe scheduling for UL LAA.

3GPP TSG RAN WG1 meeting #84 R1-160593, St Julian's, Malta, Feb. 15-19, 2016, Source: OPPO, Title: PUSCH transmission on eLAA carrier.

3GPP TSG RAN WG1 meeting #84 R1-160625, St Julian's, Malta, Feb. 15-19, 2016, Source: LG Electronics, Title: PUSCH transmission in LAA.

3GPP TSG RAN WG1 meeting #84 R1-160629, St Julian's, Malta, Feb. 15-19, 2016, Source: LG Electronics, Title: Evaluation of LBT operation in LAA UL.

3GPP TSG RAN WG1 meeting #84 R160630, St Julian's, Malta, Feb. 15-19, 2016, Source: LG Electronics, Title: LBT schemes in LAA UL.

3GPP TSG RAN WG1 meeting #84 R1-160788, St Julian's, Malta, Feb. 15-19, 2016, Source: Nokia Networks, Alcatel-Lucent, Alcatel-Lucent Shanghai Bell, Title: On LAA PUSCH scheduling and UL grant enhancements.

3GPP TSG RAN WG1 #84 R1-160885, St Julian's, Malta, Feb. 15-19, 2016, Source: Qualcomm Incorporated; Title: Control details for UL in LAA.

3GPP TSG RAN WG1 meeting #84 R1-160947, St Julian's, Malta, Feb. 15-19, 2016, Source: NTT Docomo, Inc., Title: Discussion on UL scheduling design for eLAA.

3GPP TSG RAN WG1 meeting #84 R1-160995, St Julian's, Malta, Feb. 15-19, 2016, Source: Ericsson, Title: On Scheduling Methods for Enhanced LAA.

3GPP TSG-RAN WG1 meeting #84 R1-161079, St Julian's, Malta, Feb. 15-19, 2016, Source: InterDigital Communications, Title: On UL data transmission for eLAA.

International Search Report dated Jul. 4, 2017, in PCT/US2017/016221.

R1-160301, 3GPP TSG RAN WG1 Meeting #84, St. Julian's, Malta, Feb. 15-19, 2016, Agenda Item: 7.3.1.2, Source: Huawei, HiSilicon, Title: SRS transmission for eLAA.

R1-160948, 3GPP TSG RAN WG1 Meeting #84, St Julian's, Malta, Feb. 15-19, 2016, Source: NTT Docomo, Inc., Title: Discussion on SRS design for eLAA UL.

* cited by examiner

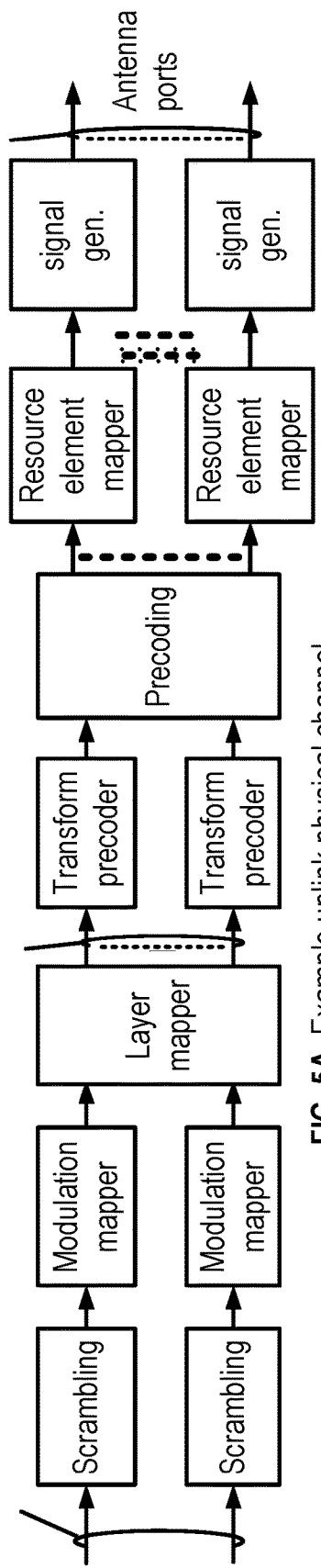
FIG. 5A Example uplink physical channel
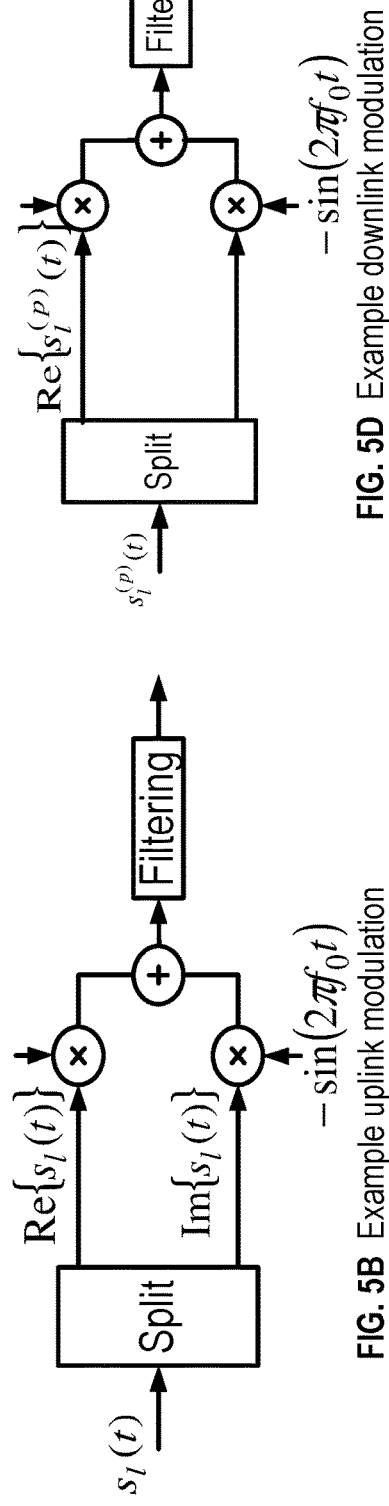
FIG. 5B Example uplink modulation
FIG. 5D Example downlink modulation
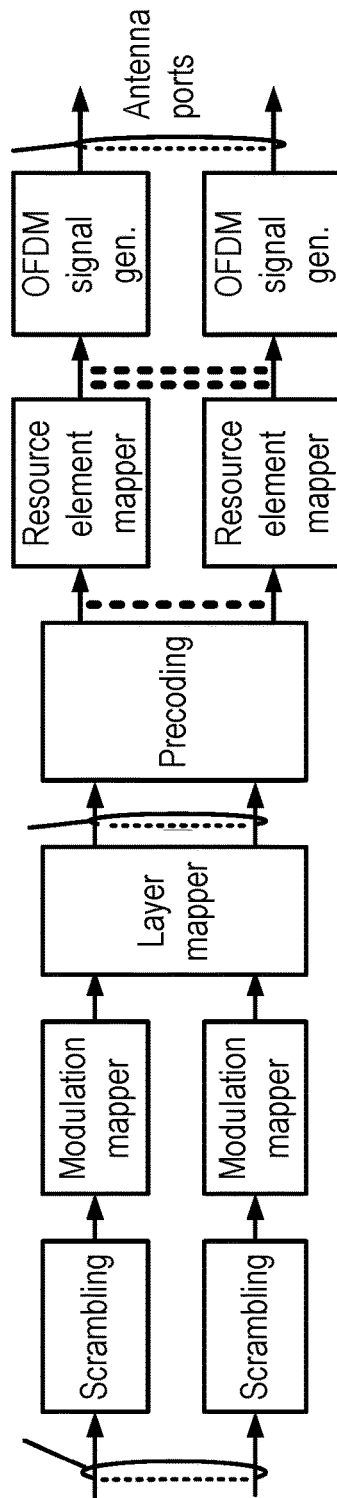
FIG. 5C Example downlink physical channel Dual-Connectivity at eNB FIG. 7 Dual-Connectivity- two MAC entities at UE side

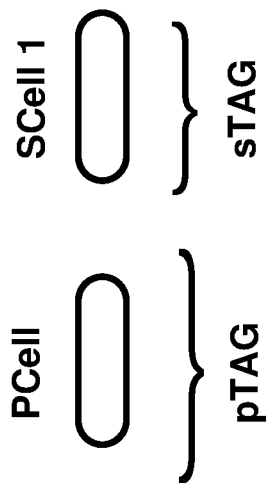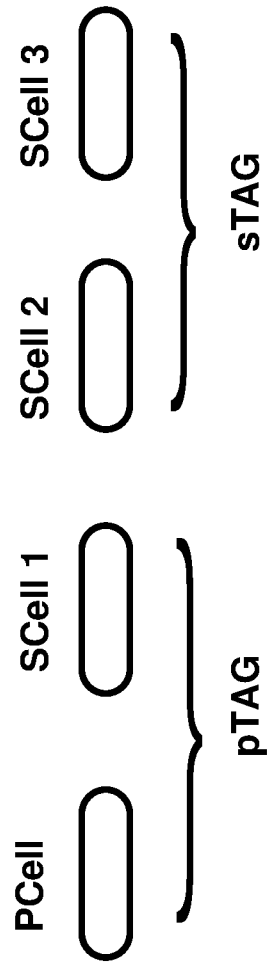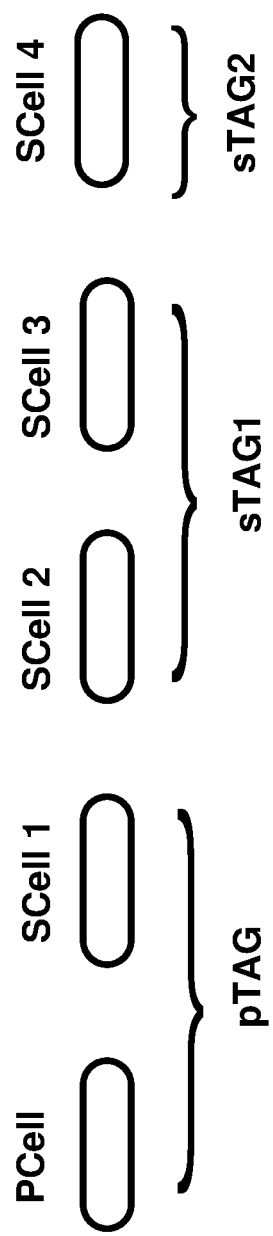
FIG. 8

TRANSMISSION OF SOUNDING REFERENCE SIGNAL IN MULTI-SUBFRAME GRANT

CROSS-REFERENCE TO RELATED APPLICATIONS

This application is a continuation of U.S. patent application Ser. No. 15/422,452, filed Feb. 1, 2017, which claims the benefit of U.S. Provisional Application No. 62/289,800, filed Feb. 1, 2016, and U.S. Provisional Application 62/314,676, filed Mar. 29, 2016, all of which are hereby incorporated by reference in their entireties.

BRIEF DESCRIPTION OF THE SEVERAL VIEWS OF THE DRAWINGS

Examples of several of the various embodiments of the present disclosure are described herein with reference to the drawings.

FIG. 5A, FIG. 5B, FIG. 5C and FIG. 5D are example diagrams for uplink and downlink signal transmission as per an aspect of an embodiment of the present disclosure.

FIG. 8 shows example TAG configurations as per an aspect of an embodiment of the present disclosure.

DETAILED DESCRIPTION OF EMBODIMENTS

Figure 1:
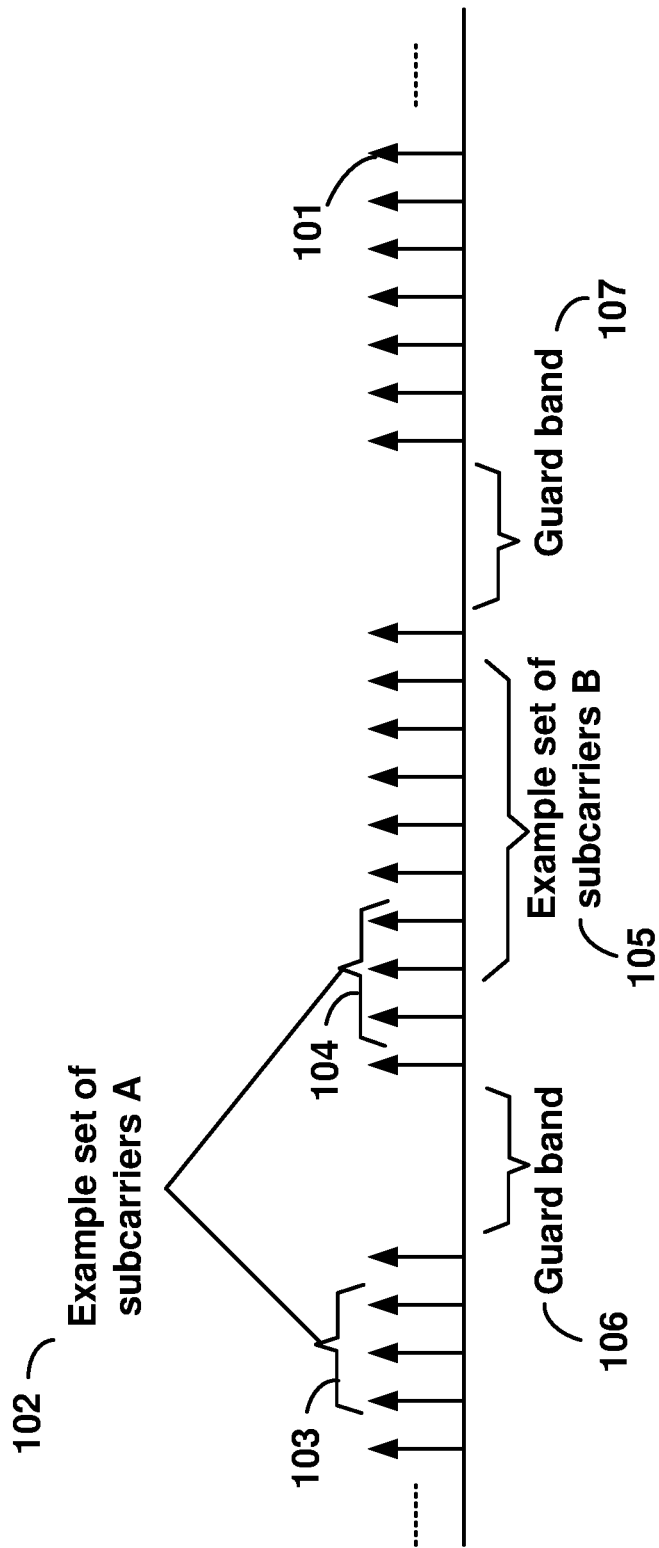
FIG. 1 is a diagram depicting example sets of OFDM subcarriers as per an aspect of an embodiment of the present disclosure.

Example embodiments of the present disclosure enable operation of carrier aggregation. Embodiments of the technology disclosed herein may be employed in the technical field of multicarrier communication systems.

The following Acronyms are used throughout the present disclosure:

ASIC application-specific integrated circuit
BPSK binary phase shift keying
CA carrier aggregation
CSI channel state information
CDMA code division multiple access
CSS common search space
CPLD complex programmable logic devices
CC component carrier
DL downlink
DCI downlink control information
DC dual connectivity
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LAA licensed assisted access
LTE long term evolution
MCG master cell group
MeNB master evolved node B
MIB master information block
MAC media access control
MAC media access control
MME mobility management entity
NAS non-access stratum
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying
RBG Resource Block Groups RLC radio link control
RRC radio resource control
RA random access
RB resource blocks
SCC secondary component carrier
SCell secondary cell
Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TB transport block
UL uplink
UE user equipment
VHDL VHSIC hardware description language Example embodiments of the disclosure may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present disclosure. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
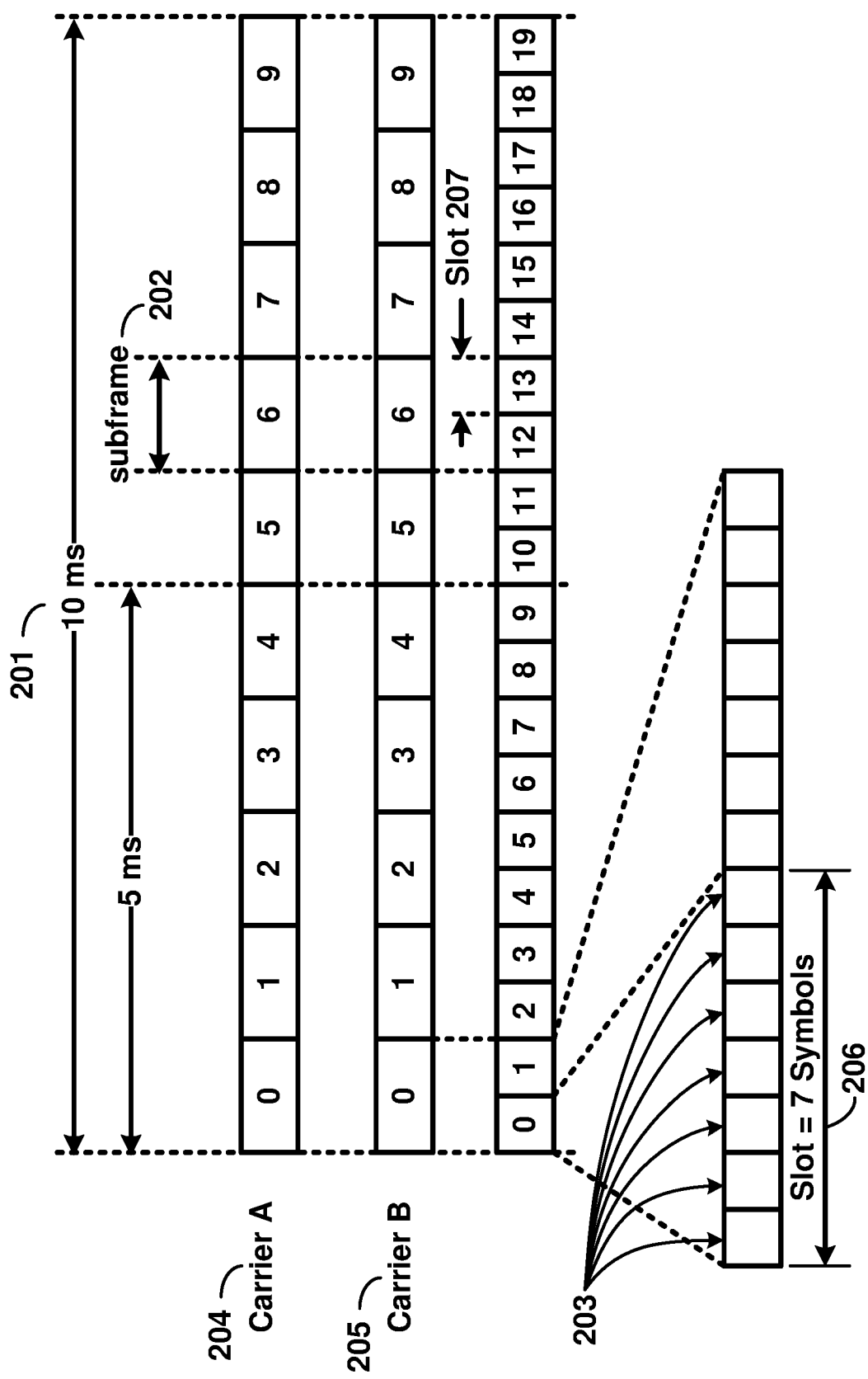
FIG. 2 is a diagram depicting an example transmission time and reception time for two carriers in a carrier group as per an aspect of an embodiment of the present disclosure.

FIG. 2 is a diagram depicting an example transmission time and reception time for two carriers as per an aspect of an embodiment of the present disclosure. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, the radio frame duration is 10 msec. Other frame durations, for example, in the range of 1 to 100 msec may also be supported. In this example, each 10 ms radio frame 201 may be divided into ten equally sized subframes 202. Other subframe durations such as 0.5 msec, 1 msec, 2 msec, and 5 msec may also be supported. Subframe(s) may consist of two or more slots (for example, slots 206 and 207). For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
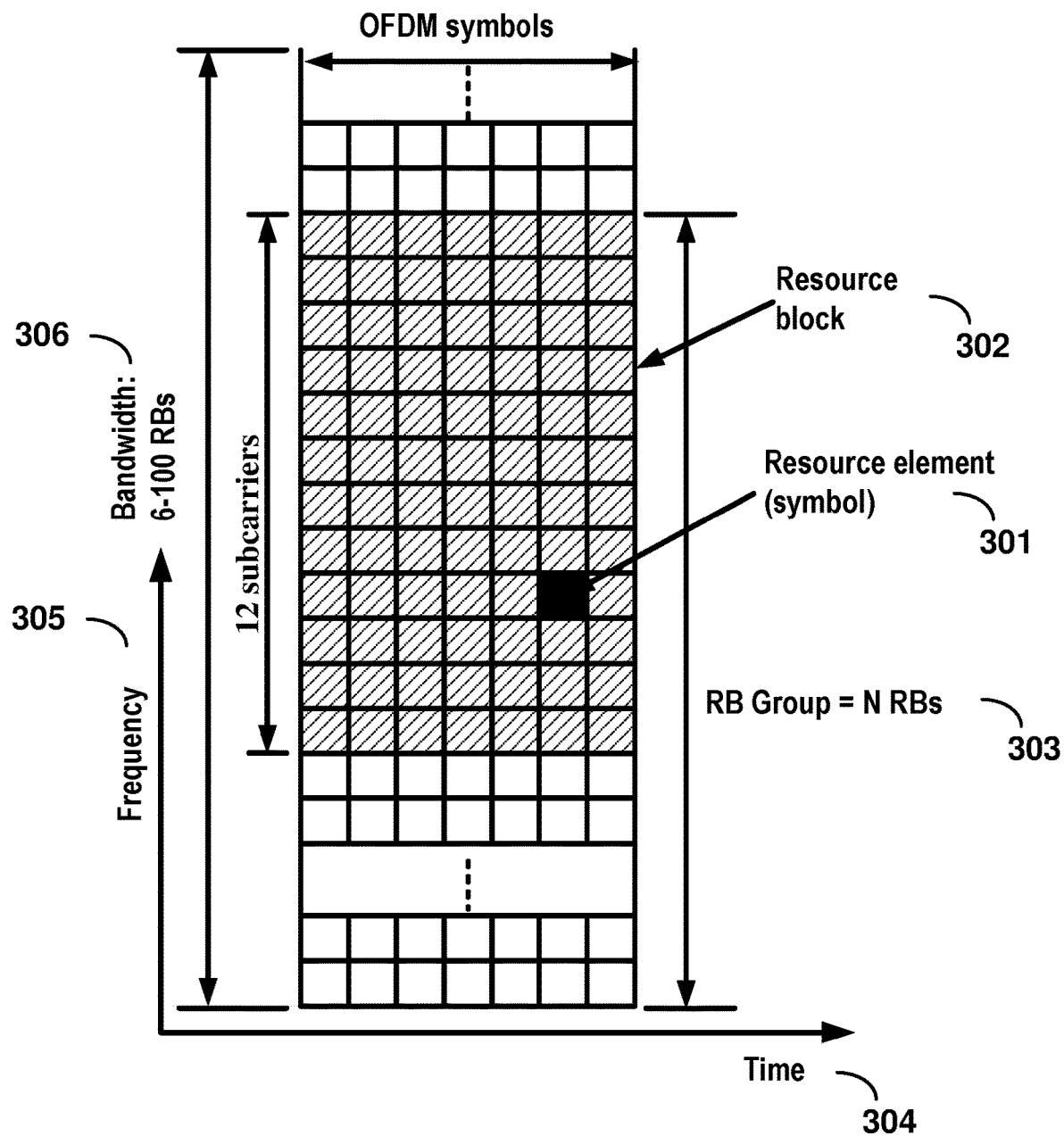
FIG. 3 is an example diagram depicting OFDM radio resources as per an aspect of an embodiment of the present disclosure.

FIG. 3 is a diagram depicting OFDM radio resources as per an aspect of an embodiment of the present disclosure. The resource grid structure in time 304 and frequency 305 is illustrated in FIG. 3. The quantity of downlink subcarriers or RBs (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

FIG. 5A, FIG. 5B, FIG. 5C and FIG. 5D are example diagrams for uplink and downlink signal transmission as per an aspect of an embodiment of the present disclosure. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
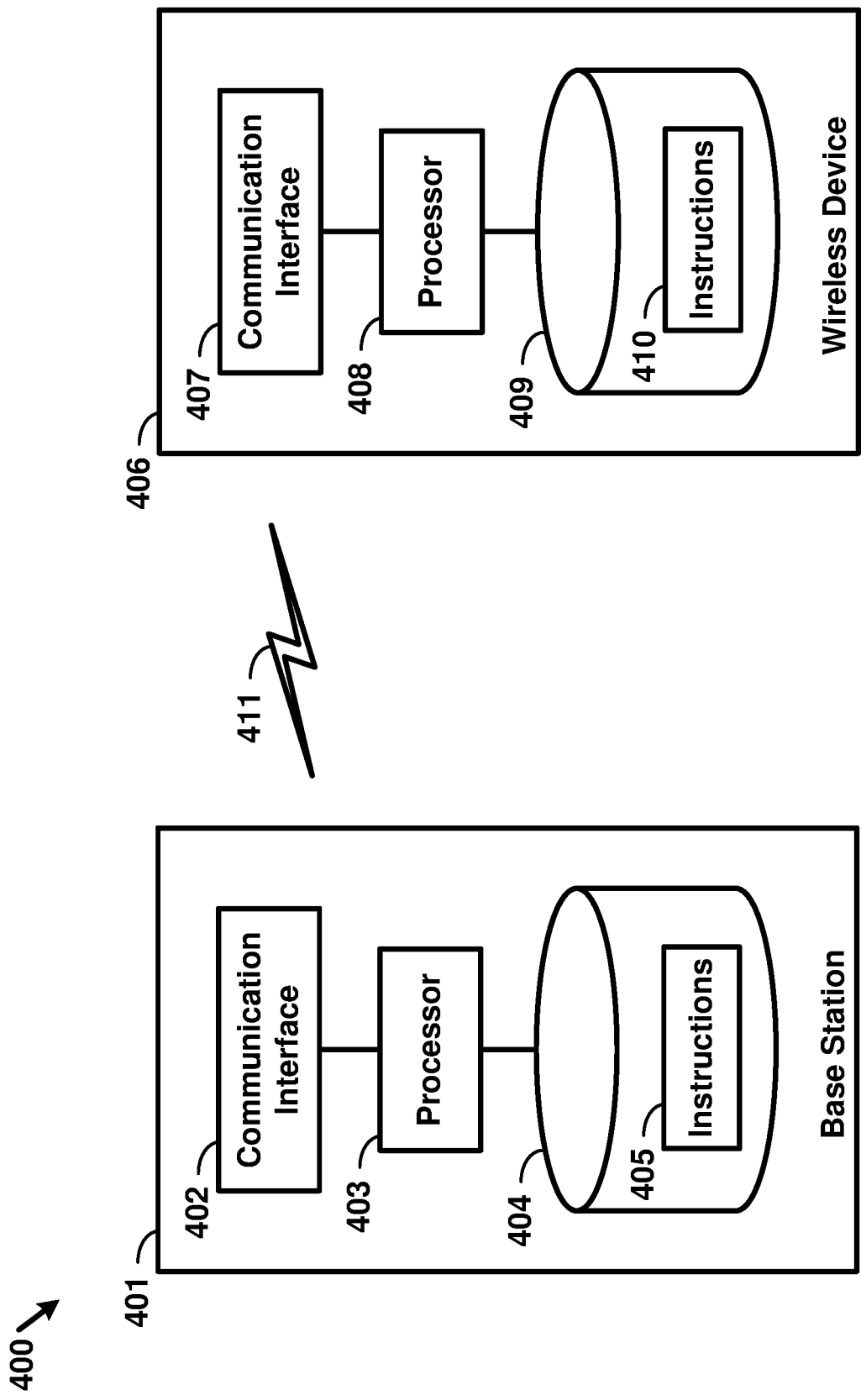
FIG. 4 is an example block diagram of a base station and a wireless device as per an aspect of an embodiment of the present disclosure.

FIG. 4 is an example block diagram of a base station 401 and a wireless device 406, as per an aspect of an embodiment of the present disclosure. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to aspects of an embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to various aspects of an embodiment, an LTE network may include a multitude of base stations, providing a user plane PDCP/RLC/MAC/PHY and control plane (RRC) protocol terminations towards the wireless device. The base station(s) may be interconnected with other base station(s) (for example, interconnected employing an X2 interface). Base stations may also be connected employing, for example, an S1 interface to an EPC. For example, base stations may be interconnected to the MME employing the S1-MME interface and to the S-G) employing the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/ handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, the carrier corresponding to the PCell may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply, for example, to carrier activation. When the specification indicates that a first carrier is activated, the specification may also mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

Figure 6:
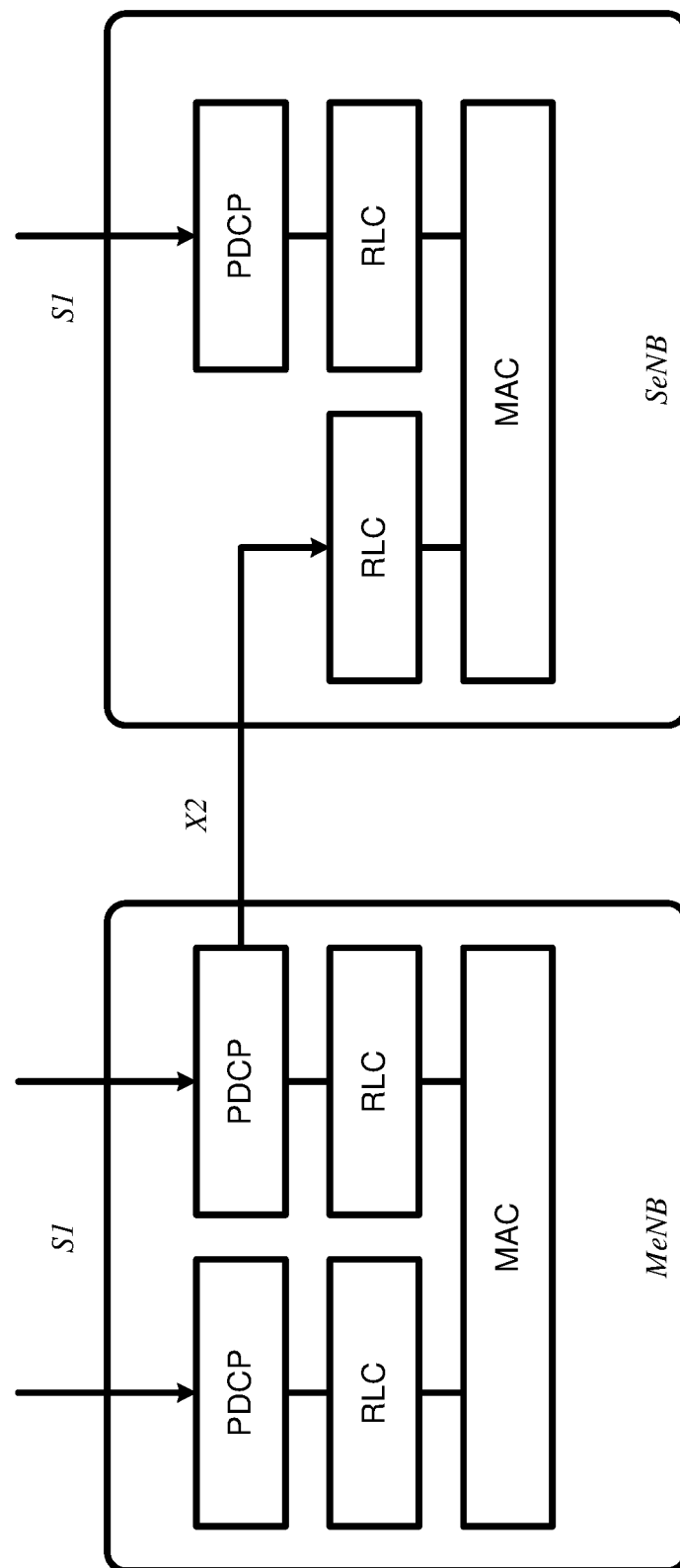
FIG. 6 is an example diagram for a protocol structure with CA and DC as per an aspect of an embodiment of the present disclosure.
Figure 7:
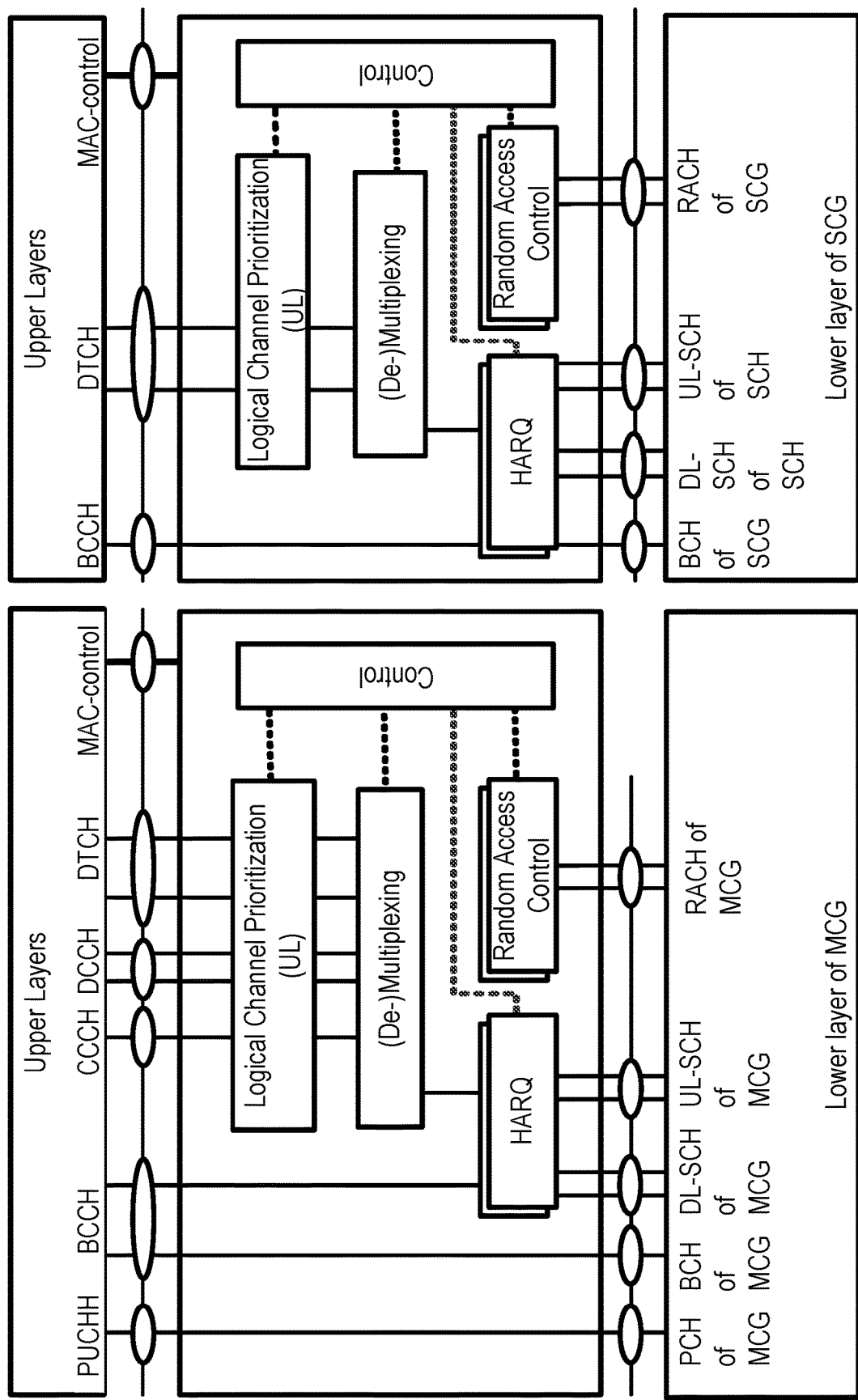
FIG. 7 is an example diagram for a protocol structure with CA and DC as per an aspect of an embodiment of the present disclosure.

FIG. 6 and FIG. 7 are example diagrams for protocol structure with CA and DC as per an aspect of an embodiment of the present disclosure. E-UTRAN may support Dual Connectivity (DC) operation whereby a multiple RX/TX UE in RRC_CONNECTED may be configured to utilize radio resources provided by two schedulers located in two eNBs connected via a non-ideal backhaul over the X2 interface. eNBs involved in DC for a certain UE may assume two different roles: an eNB may either act as an MeNB or as an SeNB. In DC a UE may be connected to one MeNB and one SeNB. Mechanisms implemented in DC may be extended to cover more than two eNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In DC, the radio protocol architecture that a particular bearer uses may depend on how the bearer is setup. Three alternatives may exist, an MCG bearer, an SCG bearer and a split bearer as shown in FIG. 6. RRC may be located in MeNB and SRBs may be configured as a MCG bearer type and may use the radio resources of the MeNB. DC may also be described as having at least one bearer configured to use radio resources provided by the SeNB. DC may or may not be configured/implemented in example embodiments of the disclosure.

In the case of DC, the UE may be configured with two MAC entities: one MAC entity for MeNB, and one MAC entity for SeNB. In DC, the configured set of serving cells for a UE may comprise two subsets: the Master Cell Group (MCG) containing the serving cells of the MeNB, and the Secondary Cell Group (SCG) containing the serving cells of the SeNB. For a SCG, one or more of the following may be applied. At least one cell in the SCG may have a configured UL CC and one of them, named PSCell (or PCell of SCG, or sometimes called PCell), may be configured with PUCCH resources. When the SCG is configured, there may be at least one SCG bearer or one Split bearer. Upon detection of a physical layer problem or a random access problem on a PSCell, or the maximum number of RLC retransmissions has been reached associated with the SCG, or upon detection of an access problem on a PSCell during a SCG addition or a SCG change: a RRC connection re-establishment procedure may not be triggered, UL transmissions towards cells of the SCG may be stopped, and a MeNB may be informed by the UE of a SCG failure type. For split bearer, the DL data transfer over the MeNB may be maintained. The RLC AM bearer may be configured for the split bearer. Like a PCell, a PSCell may not be de-activated. A PSCell may be changed with a SCG change (for example, with a security key change and a RACH procedure), and/or neither a direct bearer type change between a Split bearer and a SCG bearer nor simultaneous configuration of a SCG and a Split bearer may be supported.

With respect to the interaction between a MeNB and a SeNB, one or more of the following principles may be applied. The MeNB may maintain the RRM measurement configuration of the UE and may, (for example, based on received measurement reports or traffic conditions or bearer types), decide to ask a SeNB to provide additional resources (serving cells) for a UE. Upon receiving a request from the MeNB, a SeNB may create a container that may result in the configuration of additional serving cells for the UE (or decide that it has no resource available to do so). For UE capability coordination, the MeNB may provide (part of) the AS configuration and the UE capabilities to the SeNB. The MeNB and the SeNB may exchange information about a UE configuration by employing RRC containers (inter-node messages) carried in X2 messages. The SeNB may initiate a reconfiguration of its existing serving cells (for example, a PUCCH towards the SeNB). The SeNB may decide which cell is the PSCell within the SCG. The MeNB may not change the content of the RRC configuration provided by the SeNB. In the case of a SCG addition and a SCG SCell addition, the MeNB may provide the latest measurement results for the SCG cell(s). Both a MeNB and a SeNB may know the SFN and subframe offset of each other by OAM, (for example, for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present disclosure. In Example 1, pTAG comprises a PCell, and an sTAG comprises SCell1. In Example 2, a pTAG comprises a PCell and SCell1, and an sTAG comprises SCel12 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
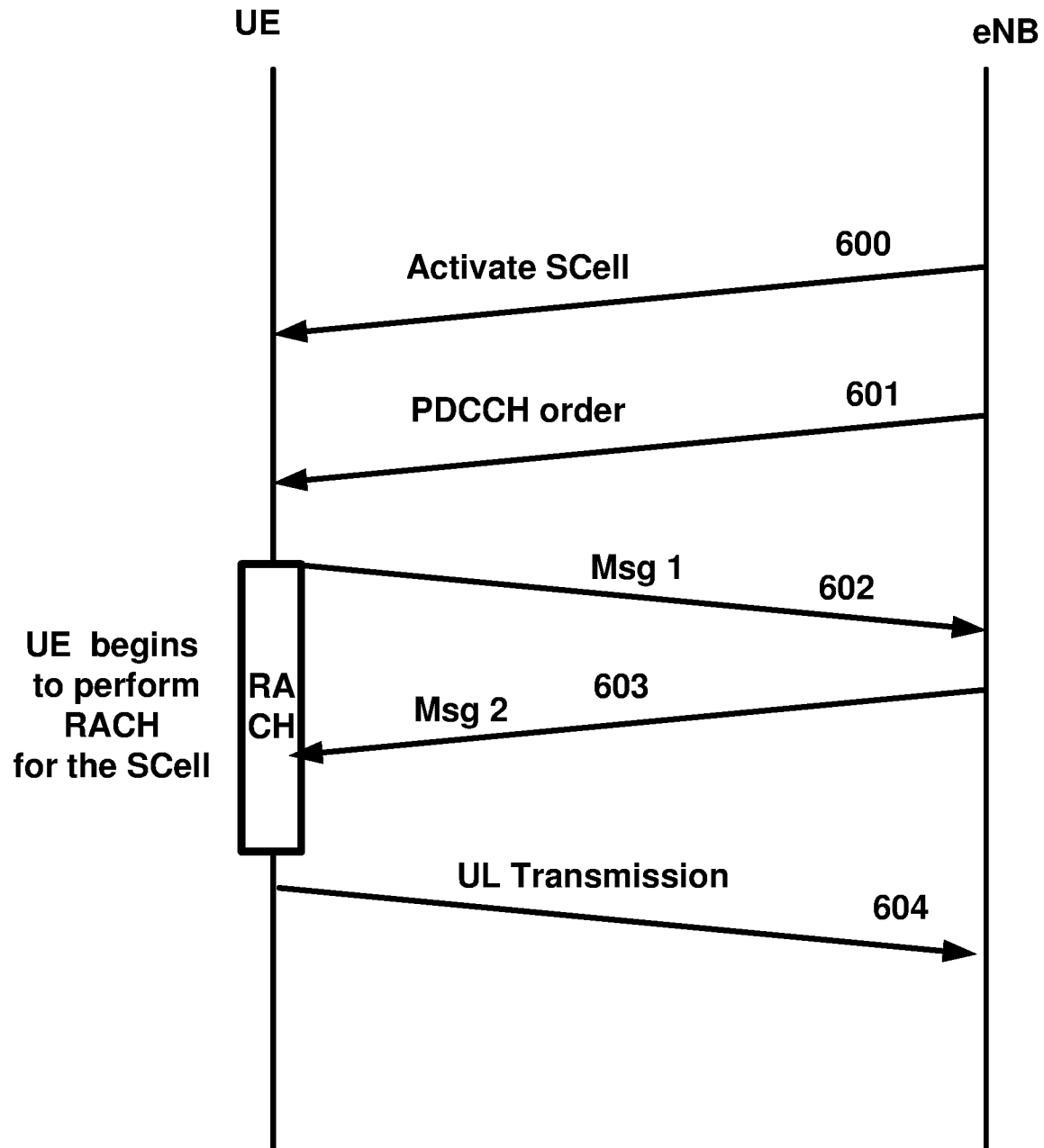
FIG. 9 is an example message flow in a random access process in a secondary TAG as per an aspect of an embodiment of the present disclosure.

FIG. 9 is an example message flow in a random access process in a secondary TAG as per an aspect of an embodiment of the present disclosure. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to an embodiment, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to various aspects of an embodiment, when an eNB performs an SCell addition configuration, the related TAG configuration may be configured for the SCell. In an example embodiment, an eNB may modify the TAG configuration of an SCell by removing (releasing) the SCell and adding(configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, (for example, at least one RRC reconfiguration message), may be send to the UE to reconfigure TAG configurations by releasing the SCell and then configuring the SCell as a part of the pTAG. When an SCell is added/configured without a TAG index, the SCell may be explicitly assigned to the pTAG. The PCell may not change its TA group and may be a member of the pTAG.

The purpose of an RRC connection reconfiguration procedure may be to modify an RRC connection, (for example, to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH may only be transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the disclosure may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

The amount of data traffic carried over cellular networks is expected to increase for many years to come. The number of users/devices is increasing and each user/device accesses an increasing number and variety of services, e.g. video delivery, large files, images. This may require not only high capacity in the network, but also provisioning very high data rates to meet customers' expectations on interactivity and responsiveness. More spectrum may therefore needed for cellular operators to meet the increasing demand. Considering user expectations of high data rates along with seamless mobility, it may be beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, may be an effective complement to licensed spectrum for cellular operators to help addressing the traffic explosion in some scenarios, such as hotspot areas. LAA may offer an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA may utilize at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs, time & frequency synchronization of UEs, and/or the like.

In an example embodiment, a DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

An LBT procedure may be employed for fair and friendly coexistence of LAA with other operators and technologies operating in an unlicensed spectrum. LBT procedures on a node attempting to transmit on a carrier in an unlicensed spectrum may require the node to perform a clear channel assessment to determine if the channel is free for use. An LBT procedure may involve at least energy detection to determine if the channel is being used. For example, regulatory requirements in some regions, for example, in Europe, may specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold. For example, LAA may employ a mechanism to adaptively lower the energy detection threshold from an upper bound. Adaptation mechanism(s) may not preclude static or semi-static setting of the threshold. In an example a Category 4 LBT mechanism or other type of LBT mechanisms may be implemented.

Various example LBT mechanisms may be implemented. In an example, for some signals, in some implementation scenarios, in some situations, and/or in some frequencies, no LBT procedure may performed by the transmitting entity. In an example, Category 2 (for example, LBT without random back-off) may be implemented. The duration of time that the channel is sensed to be idle before the transmitting entity transmits may be deterministic. In an example, Category 3 (for example, LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (for example, LBT with random back-off with a contention window of variable size) may be implemented. The transmitting entity may draw a random number N within a contention window. The size of the contention window may be specified by a minimum and maximum value of N. The transmitting entity may vary the size of the contention window when drawing the random number N. The random number N may be employed in the LBT procedure to determine the duration of time that the channel is sensed to be idle before the transmitting entity transmits on the channel.

LAA may employ uplink LBT at the UE. The UL LBT scheme may be different from the DL LBT scheme (for example, by using different LBT mechanisms or parameters), since the LAA UL may be based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. A UL transmission burst from a UE perspective may be a continuous transmission from a UE with no transmission immediately before or after from the same UE on the same CC. In an example, a UL transmission burst may be defined from a UE perspective. In an example, a UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

Figure 10:
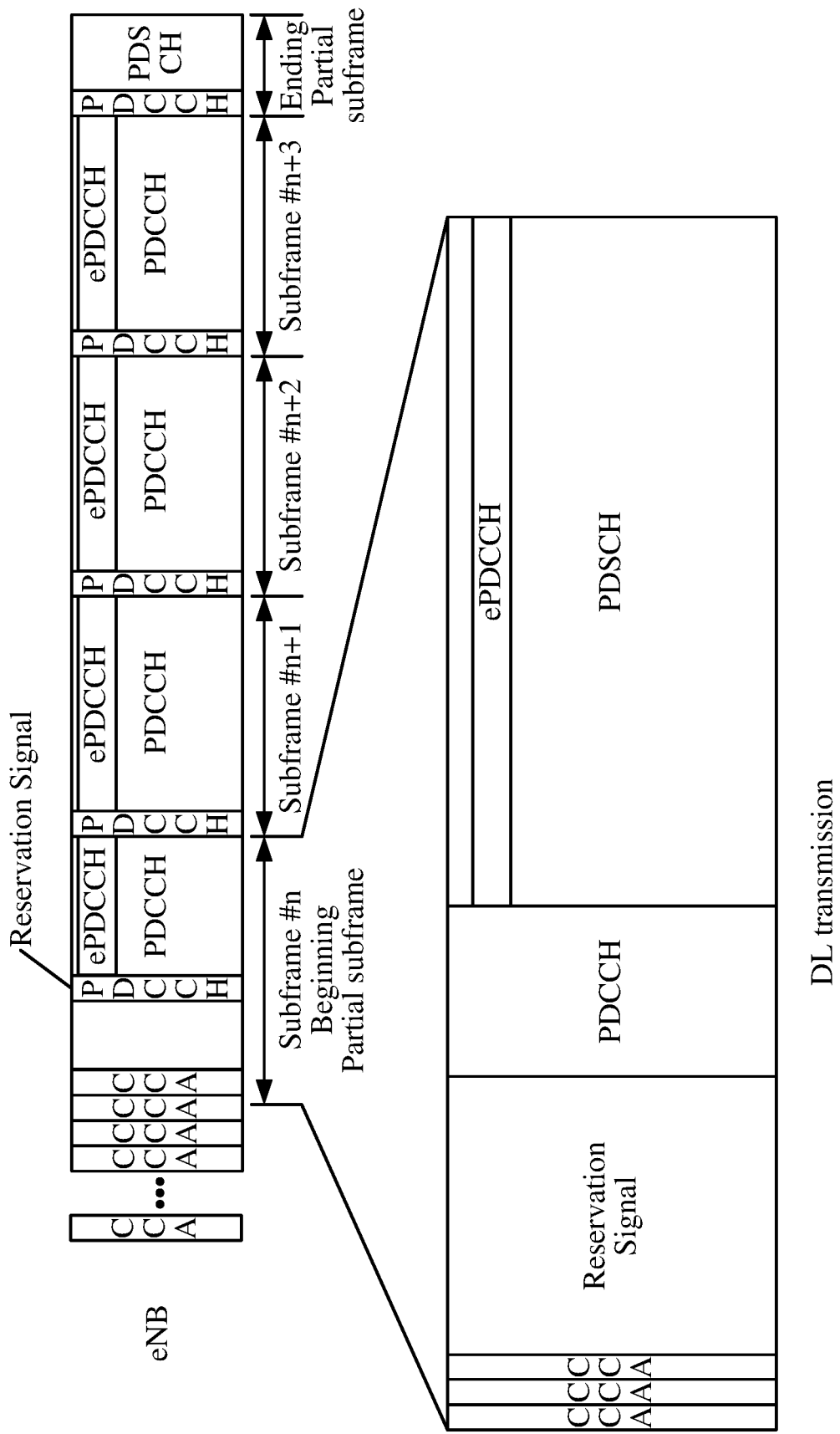
FIG. 10 is an example diagram depicting a downlink burst as per an aspect of an embodiment of the present disclosure.

In an example embodiment, in an unlicensed cell, a downlink burst may be started in a subframe. When an eNB accesses the channel, the eNB may transmit for a duration of one or more subframes. The duration may depend on a maximum configured burst duration in an eNB, the data available for transmission, and/or eNB scheduling algorithm. FIG. 10 shows an example downlink burst in an unlicensed (e.g. licensed assisted access) cell. The maximum configured burst duration in the example embodiment may be configured in the eNB. An eNB may transmit the maximum configured burst duration to a UE employing an RRC configuration message.

The wireless device may receive from a base station at least one message (for example, an RRC) comprising configuration parameters of a plurality of cells. The plurality of cells may comprise at least one license cell and at least one unlicensed (for example, an LAA cell). The configuration parameters of a cell may, for example, comprise configuration parameters for physical channels, (for example, a ePDCCH, PDSCH, PUSCH, PUCCH and/or the like).

Frame structure type 3 may be applicable to an unlicensed (for example, LAA) secondary cell operation. In an example, frame structure type 3 may be implemented with normal cyclic prefix only. A radio frame may be $T_f$=307200·$T_s$=10 ms long and may comprise 20 slots of length $T_{slot}$=15360·$T_s$=0.5 ms, numbered from 0 to 19. A subframe may be defined as two consecutive slots where subframe i comprises of slots 2i and 2i+1. In an example, the 10 subframes within a radio frame may be available for downlink and/or uplink transmissions. Downlink transmissions may occupy one or more consecutive subframes, starting anywhere within a subframe and ending with the last subframe either fully occupied or following one of the DwPTS durations in a 3GPP Frame structure 2 (TDD frame). When an LAA cell is configured for uplink transmissions, frame structure 3 may be used for both uplink or downlink transmission.

An eNB may transmit one or more RRC messages to a wireless device (UE). The one or more RRC messages may comprise configuration parameters of a plurality of cells comprising one or more licensed cells and/or one or more unlicensed (for example, Licensed Assisted Access-LAA) cells. The one or more RRC messages may comprise configuration parameters for one or more unlicensed (for example, LAA) cells. An LAA cell may be configured for downlink and/or uplink transmissions.

In an example, the configuration parameters may comprise a first configuration field having a value of N for an LAA cell. The parameter N may be RRC configurable. N may be a cell specific or a UE specific RRC parameter. For example, N (for example, 6, 8, 16) may indicate a maximum number of HARQ processes that may be configured for UL transmissions. In an example, one or more RRC messages may comprise configuration parameters of multi-subframe allocation parameters, maximum number of HARQ processes in the uplink, and/or other parameters associated with an LAA cell.

In an example, a UE may receive a downlink control information (DCI) indicating uplink resources (resource blocks for uplink grant) for uplink transmissions.

Figure 11:
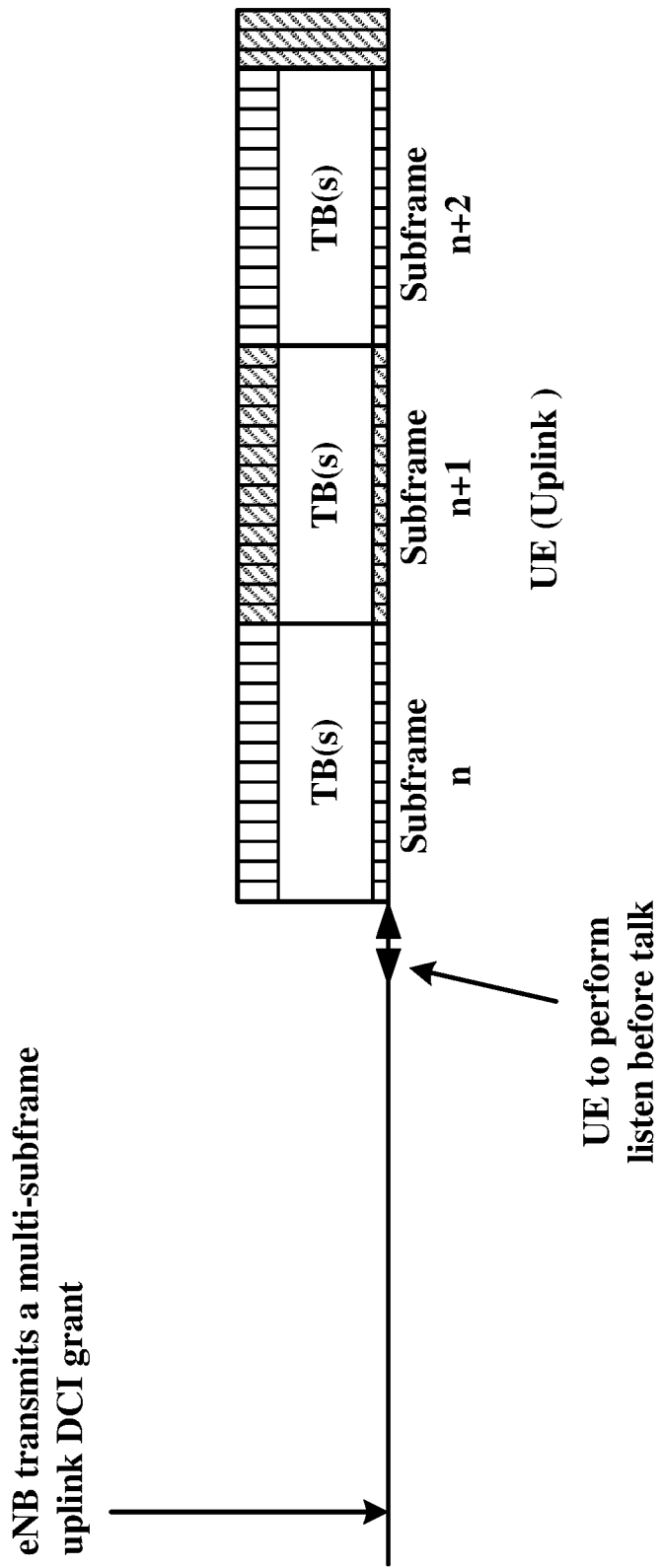
FIG. 11 is an example diagram depicting an example multi-subframe grant, LBT process, and multi-subframe transmission as per an aspect of an embodiment of the present disclosure.

In an example embodiment, persistent (also called burst or multi-subframe) scheduling may be implemented. An eNB may schedule uplink transmissions by self scheduling and/or cross scheduling. In an example, an eNB may use UE C-RNTI for transmitting DCIs for multi-subframe grants. A UE may receive a multi-subframe DCI indicating uplink resources (resource blocks for uplink grant) for more than one consecutive uplink subframes (a burst), for example m subframes. In an example, a UE may transmit m subpackets (transport blocks-TBs), in response to the DCI grant. FIG. 11 shows an example multi-subframe grant, LBT process, and multi-subframe transmission.

In an example embodiment, an uplink DCI may comprise one or more fields including uplink RBs, a power control command, an MCS, the number of consecutive subframes (m), and/or other parameters for the uplink grant.

In an example, a multi-subframe DCI may comprise one or more parameters indicating that a DCI grant is a multi-subframe grant. A field in a multi-subframe DCI may indicate the number of scheduled consecutive subframes (m). For example, a DCI for an uplink grant on an LAA cell may comprise a 3-bit field. The value indicated by the 3-bit field may indicate the number of subframes associated with the uplink DCI grant (other examples may comprise, for example, a 1-bit field or a 2-bit field). For example, a value 000 may indicate a dynamic grant for one subframe. For example, a field value 011 may indicate a DCI indicating uplink resources for 4 scheduled subframes (m=field value in binary+1). In an example, RRC configuration parameters may comprise a first configuration field having a value of N for an LAA cell. In an example implementation, the field value may be configured to be less than N. For example, N may be configured as 2, and a maximum number of scheduled subframes in a multi-subframe grant may be 2. In an example, N may be configured as 4 and a maximum number of scheduled subframes in a multi-subframe grant may be 4. In an example, N may be a number of configured HARQ processes in an UL. Successive subframes on a carrier may be allocated to a UE when the UE receives a multi-subframe UL DCI grant from an eNB.

At least one field included in a multi-subframe DCI may determine transmission parameters and resource blocks used across m consecutive subframes for transmission of one or more TBs. The DCI may comprise an assignment of a plurality of resource blocks for uplink transmissions. The UE may use the RBs indicated in the DCI across m subframes. The same resource blocks may be allocated to the UE in m subframes as shown in FIG. 11.

A UE may perform listen before talk (LBT) before transmitting uplink signals. The UE may perform an LBT procedure indicating that a channel is clear for a starting subframe of the one or more consecutive uplink subframes. The UE may not perform a transmission at the starting subframe if the LBT procedure indicates that the channel is not clear for the starting subframe.

In an example embodiment, a wireless device may receive one or more radio resource control (RRC) messages comprising configuration parameters for a licensed assisted access (LAA) cell. The one or more RRC messages may comprise one or more consecutive uplink subframe allocation configuration parameters. In an example, the one or more consecutive uplink subframe allocation configuration parameters comprises a first field, N.

A wireless device may receive a downlink control information (DCI) indicating uplink resources in a number of one or more consecutive uplink subframes of the LAA cell. The DCI may comprise: the number of the one or more consecutive uplink subframes (m); an assignment of a plurality of resource blocks; and a transmit power control command. The first field may indicate an upper limit for the number of the one or more consecutive uplink subframes.

The wireless device may perform a listen before talk procedure indicating that a channel is clear for a starting subframe of the one or more consecutive uplink subframes. The wireless device may transmit one or more transport blocks, via the plurality of resource blocks used across the one or more consecutive uplink subframes. At least one field included in a multi-subframe DCI may determine transmission parameters and resource blocks used across m consecutive subframes for transmission of one or more TBs. The DCI may comprise an assignment of a plurality of resource blocks for uplink transmissions. The UE may use the RBs indicated in the DCI across m subframes. The same resource blocks may be allocated to the UE in m subframes.

A DCI indicating a multi-subframe grant (MSFG) may be supported in carrier aggregation, for example, for an unlicensed cell (e.g. an LAA cell). Design of a multi-subframe grant (MSFG) may take into account the design of existing DCIs used for single subframe grants. For example, current LTE-A DCI Format 0 and 4 may be used for uplink grants with and without special multiplexing. DCI Format 0 and 4 may be updated to support MSFGs with or without special multiplexing.

A MSFG may allow a UE to transmit on multiple consecutive uplink subframes based on some common set of transmission parameters. Some of transmission parameters, like MCS level, power control command, and/or resource assignments (e.g. RBs) may be common across scheduled subframes. Some parameters, like HARQ process ID, RV and/or NDI may be subframe specific. The DCI indicating a MSFG may comprise one or more parameters indicating the number of consecutive subframes allowed for transmission according to the grant. In an example, the parameters which may be configured by DCI may include the number of consecutive subframes (m) associated with the MSFG. A MSFG may provide resource allocation for subframes starting from subframe n and ending at subframe n+m−1.

When a UE receives a multi-subframe grant (MSFG) for UL transmissions of m consecutive subframes on an LAA carrier, the UE may perform LBT before transmission on the scheduled subframes. A successful LBT may be followed by a reservation signal if transmission of the reservation signals is allowed and/or needed. The UE's LBT may or may not succeed before start of a first allowed transmission symbol of subframe n. In an example, if UE's LBT is successful before a first allowed transmission symbol of subframe n, the UE may transmit data according to multi-subframe DCI. The UE may transmit data (TBs) when LBT is successful.

The DCI indicating a MSFG may include parameters for UEs behavior due to LBT. A multi-subframe DCI may include possible LBT time interval(s) and/or at least one LBT configuration parameter. The DCI may indicate one or more configuration parameters for LBT process before transmissions corresponding to a MSFG.

In an example, one or more DCI may indicate configuration for transmission of reservation signals, format of reservation signals, allowed starting symbol, and/or LBT intervals/symbols associated with a MSFG. For example, the DCI may indicate a PUSCH starting position in a subframe. LBT procedure may be performed before the PUSCH starting position. One or more DCI may comprise configuration parameters indicating reservation signals and/or partial subframe configuration. In an example embodiment, transmission of reservation signals and/or partial subframe for a multi-subframe grant may not be supported.

In an example, a UE may perform LBT (e.g. in a symbol) before subframe n starts. In an example, a UE may perform LBT in a first symbol of subframe n. A UE may be configured to perform LBT in one or more allowed symbols of a subframe, or within a configured period/interval in a subframe. The multi-subframe grant DCI may include possible LBT time interval(s) and/or at least one LBT configuration parameter. For example, DCI may indicate that PUSCH starts in symbol 0 and a LBT procedure is performed before PUSCH starts (e.g. last symbol of a previous subframe). For example, DCI may indicate that PUSCH starts in symbol 1 and an LBT procedure is performed before PUSCH starts (e.g. in symbol 0).

In an example, one or more LBT configuration parameters may be indicated in an RRC message. In an example, one or more RRC message configuring an LAA cell may comprise at least one field indicating an LBT interval.

An eNB may transmit to a UE one or more RRC messages comprising configuration parameters of a plurality of cells. The plurality of cells may comprise one or more licensed cell and one or more unlicensed (e.g. LAA) cells. The eNB may transmit one or more DCIs for one or more licensed cells and one or more DCIs for unlicensed (e.g. LAA) cells to schedule downlink and/or uplink TB transmissions on licensed/LAA cells.

A UE may receive at least one downlink control information (DCI) from an eNB indicating uplink resources in m subframes of a licensed assisted access (LAA) cell. In an example embodiment, an MSFG DCI may include information about RV, NDI and HARQ process ID of a subframe of the grant. For example, when a grant is for m subframes, the grant may include at least m set of RVs and NDIs for HARQ processes associated with m subframes in the grant. In an example, subframe specific parameters may comprise one or more of the following for each subframe of a MSFG burst: M bits for RV, example 2 bits for 4 redundancy versions; and/or 1 bit for NDI.

In an example, common parameters may include: TPC for PUSCH, Cyclic shift for DM RS, resource block assignment, MCS and/or spatial multiplexing parameters (if any, for example included in DCI format 4), LBT related parameters applied to the uplink burst, and/or Other parameters, e.g. one or more multi-subframe configuration parameters. The MSFG DCI may comprise an RB assignment field, an MCS field, an TPC field, an LBT field applicable to all the subframes associated with a MSFG. These parameters may be the same for different subframes of a MSFG burst. Resource block assignment, MCS and/or spatial multiplexing parameters may change from one MSFG burst to another MSFG burst.

An eNB may transmit to a UE a MSFG DCI including an SRS request for an LAA cell. There is a need to define mechanisms for an SRS transmission in an LAA cell when a UE receives a MSFG DCI comprising an SRS request. There is a need to define an offset k, which may determine earliest time SRS transmission may be made after the receipt of an SRS request. In an LAA cell, a UE's access to the channel for SRS transmission may be subject to some LBT requirements and/or COT limitation. There is a need to implement mechanisms to determine timing of aperiodic SRS transmission(s) within an uplink MSFG burst.

In an example embodiment, an eNB may transmit to a UE at least one RRC message comprising configuration parameters of one or more licensed cells and one or more unlicensed cells. The configuration parameters may comprise SRS configuration parameters. One or more SRS configuration parameters may be common parameters and one or more SRS configuration parameters may be dedicated parameters. Example SRS RRC configuration parameters are presented in the specifications. In an example embodiment, a set of parameters, e.g. srs-ConfigApDCI-Format0 may be configured by RRC for aperiodic SRS, e.g. triggered using DCI Format 0. For example, a common set of parameters srs-ConfigApDCI-Format1a2b2c may be configured by RRC, e.g. for aperiodic SRS using DCI formats 1A/2B/2C. In an example, three sets of SRS parameters, srs-ConfigApDCI-Format4, may be configured by RRC for aperiodic SRS using DCI Format 0 and/or 4.

Some of the configuration parameters of aperiodic SRS may be configured by RRC. Aperiodic SRS may be triggered by an SRS request field in a UE specific DCI. For example, PDCCH DCI Formats 0/4/1A (for FDD and TDD) and DCI Formats 2B/2C for TDD may include an SRS request field.

In an example embodiment, an uplink MSFG DCI may further comprise an SRS request field. The SRS request (e.g. 2 bits) may be used to trigger aperiodic sounding reference signal (SRS). In an example, the SRS may be triggered using one of up to three preconfigured settings. In an example, for aperiodic SRS trigger, a 1-bit SRS request field may be used. In an example, a DCI may include a 2-bit SRS request field to indicate which of three configured parameters set to be used according to a pre-specified configuration table.

In an example embodiment, aperiodic SRS may be triggered by an SRS request field in a UE specific DCI. For example, an uplink MSFG DCI may include an SRS request field. The RRC configuration parameters may comprise configuration parameters of a DCI for SRS trigger. For example, configuration parameters may include an index of the DCI request field for a UE in the DCI. RRC configuration parameters may comprise an aperiodic SRS time domain (subframe) RRC configuration parameter employed for determining a subframe for aperiodic SRS transmission. When a UE receives a MSFG DCI comprising an SRS request, the UE may transmit an SRS in an SRS subframe opportunity that occurs in the multi-subframe uplink burst. The SRS subframe opportunity may depend on a UE specific SRS RRC configuration parameter(s).

Figure 13:
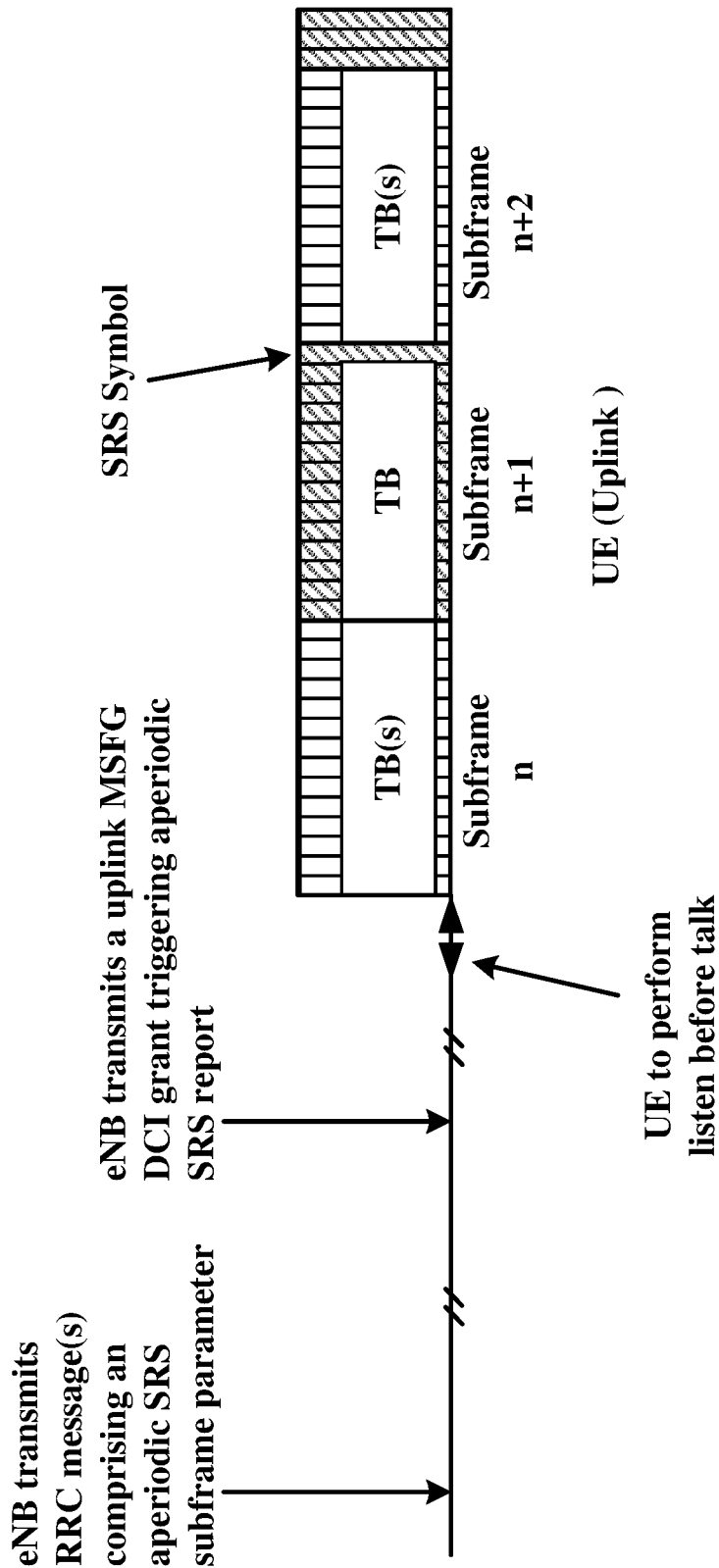
FIG. 13 is an example diagram depicting an example multi-subframe grant, LBT process, and multi-subframe transmission as per an aspect of an embodiment of the present disclosure.

A wireless device may receive one or more radio resource control (RRC) messages comprising configuration parameters for a licensed assisted access (LAA) cell. The configuration parameters may comprise an aperiodic sounding reference signal (SRS) subframe parameter. In an example, a wireless device may receive a MSFG DCI indicating uplink resources in a number of one or more consecutive subframes of the LAA cell. The DCI may trigger an SRS transmission. The DCI may comprise a field indicating the number of one or more consecutive subframes, and/or one or more LBT configuration parameters (e.g. LBT type, LBT priority class, and/or LBT symbol). The wireless device may determine a position of a first subframe in the one or more consecutive subframes based, at least in part, on the aperiodic SRS subframe parameter. The wireless device may transmit, in the first subframe, the SRS on the LAA cell. The wireless device may transmit, in the first subframe, the SRS on the LAA cell when the wireless device is allowed to transmit in the first subframe according to an LBT procedure based on the LBT configuration parameter(s). The aperiodic SRS subframe parameter may indicate an offset from the first (starting) scheduled subframe in a MSFG burst. For example, if the first scheduled subframe is subframe n, then the SRS is transmitted in subframe n+offset. In an example, an RRC configuration may indicate that the starting subframe of a MSFG includes an aperiodic SRS when a MSFG DCI triggers SRS transmission. In an example, an RRC configuration may indicate that the second (next to the starting) subframe of a MSFG includes an aperiodic SRS when a MSFG DCI triggers SRS transmission. An example is shown in FIG. 13. Other examples may be provided.

Example embodiments provide an efficient mechanism for determining which subframe of a MSFG includes an SRS signal when a MSFG DCI includes an SRS request field triggering aperiodic SRS. Configuring SRS subframe for an aperiodic SRS configuration (trigger type 1) for an LAA cell enables an eNB to semi-statically communicate which subframe in a MSFG burst includes an SRS. Example embodiments enable a UE to determine the SRS subframe offset from the starting (first scheduled) MSFG subframe. The starting subframe is dynamically signaled using DCI signaling. In this mechanism, SRS subframe is dynamically configured using a DCI timing, MSFG burst starting time, and semi-static RRC configuration parameter. This mechanism may avoid including an SRS position field and/or trigger field for each subframe associated with a MSFG and may reduce RRC signaling and PDCCH overhead. Example embodiments may enhance downlink spectral efficiency by reducing control signaling overhead and may enhance uplink radio efficiency by determining which subframe in a MSFG burst includes SRS transmission. Instead of transmitting SRS in each subframe of a MSFG burst, SRS is transmitted in one of the MSFG burst subframes.

In an example, a UE configured for Aperiodic SRS transmission upon detection of a positive SRS request in subframe # n may commence SRS transmission in the first subframe satisfying subframe # n+k, e.g. k≥4 and based, at least, on the aperiodic SRS time domain (subframe) radio resource configuration (RRC). When a UE receives a MSFG DCI comprising an SRS request, the UE may transmit an SRS in an SRS subframe opportunity that occurs in a subframe associated with a MSFG.

In an example, an eNB may transmit a DCI triggering an aperiodic SRS request for one or more LAA cells. A UE configured for aperiodic SRS transmission on frame structure type 3, upon detection of a positive SRS request in subframe n, may start SRS transmission in a first subframe satisfying subframe # n+k, k≥4 and based on SRS time domain (subframe) RRC configuration if that subframe is available for uplink SRS transmission. When a UE receives a MSFG DCI comprising an SRS request, the UE may transmit an SRS in an SRS subframe opportunity that occurs in a MSFG burst. Availability of a subframe/symbol for uplink SRS transmission may be determined based on LAA uplink cell access rules, e.g. LBT and/or maximum COT.

In an example embodiment, SRS transmission subframes may be configured dynamically via a MSFG DCI. In an example embodiment, the DCI may indicate a specific subframe within a MSFG burst for transmission of aperiodic SRS request. For example, when an SRS is triggered an SRS may be transmitted subframe identified by a subframe offset relative to the starting subframe (first scheduled subframe) in a MSFG burst. In an example, the DCI may comprise a 3 bit field indicating the offset.

Figure 12:
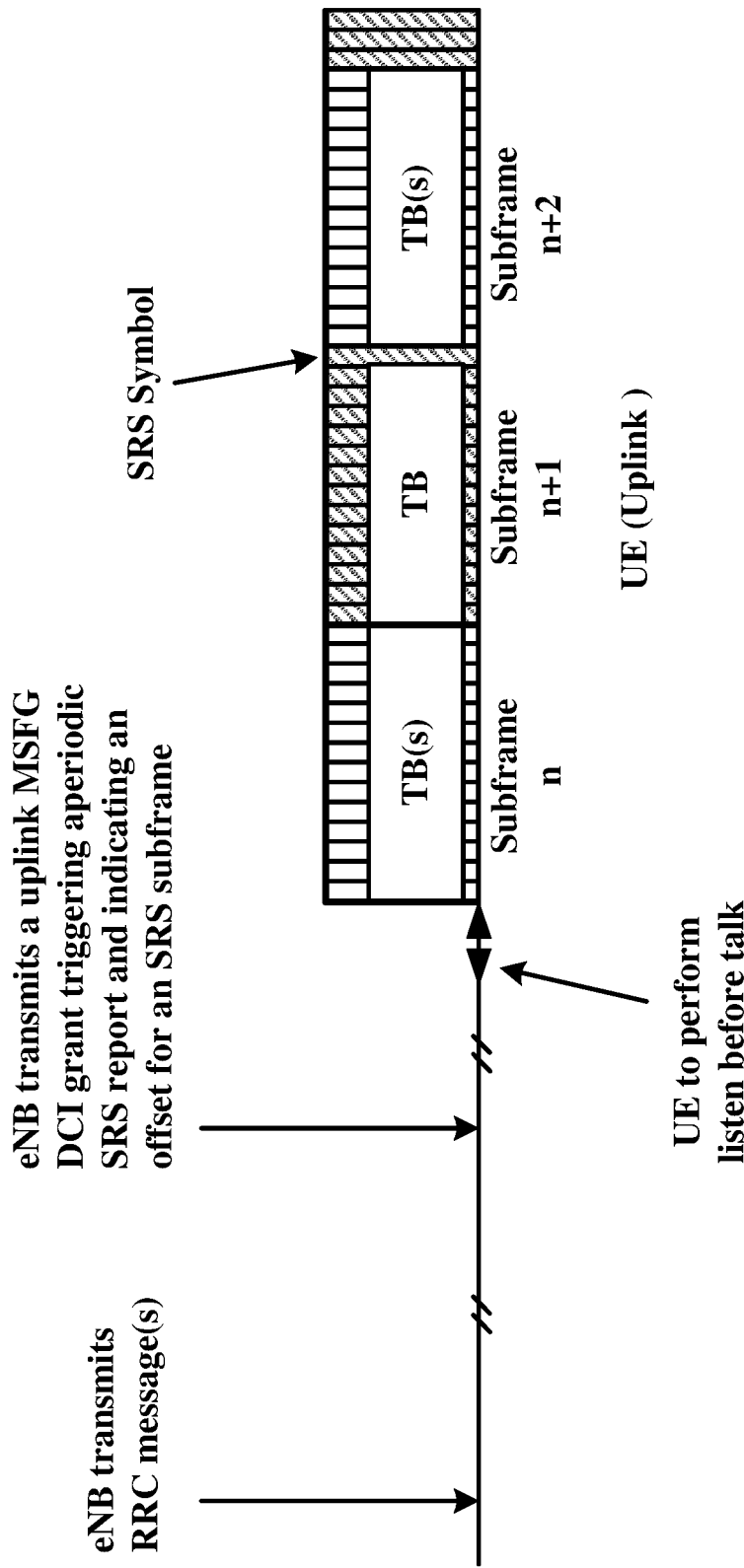
FIG. 12 is an example diagram depicting an example multi-subframe grant, LBT process, and multi-subframe transmission as per an aspect of an embodiment of the present disclosure.

In an example embodiment, a wireless device may receive one or more radio resource control (RRC) messages comprising configuration parameters for a licensed assisted access (LAA) cell. The configuration parameters comprising one or more sounding reference signal (SRS) parameters. The wireless device may receive a MSFG DCI indicating uplink resources in a number of one or more consecutive subframes of the LAA cell. The DCI may trigger an aperiodic SRS transmission. The DCI may comprise a first field indicating the number of one or more consecutive subframes and/or a second field indicating a position of a first subframe in the one or more consecutive subframes for transmission of an SRS, and/or a third field indicating a listen-before-talk (LBT) configuration. The second field may indicate an offset from the first (starting) scheduled subframe in a MSFG burst. For example, if the first scheduled subframe is subframe n, then the SRS is transmitted in subframe n+offset. The second field may indicate an offset from the first (starting) scheduled subframe of a MSFT burst (the one or more consecutive subframes). The wireless device may transmit, on the LAA cell and in the first subframe the SRS. The wireless device may transmit, on the LAA cell and in the first subframe, the SRS when the wireless device is allowed to transmit in the first subframe according to an LBT procedure based on the LBT configuration. An example is shown in FIG. 12. The MSFG DCI may further comprise a transmit power control (TPC) command employed, at least in part, for calculating a transmit power for the SRS.

Example embodiments provide an efficient mechanism for determining which subframe of a MSFG includes an SRS signal when a MSFG DCI triggers aperiodic SRS. The eNB does not need to transmit multiple SRS request fields in a MSFG DCI, each for a different subframe of the MSFG burst. Example embodiments enable a UE to determine the SRS subframe offset from the starting MSFG subframe. This mechanism may not require including multiple SRS fields in a MSFG DCI, one for each subframe associated with a MSFG. Example embodiments may reduce the size of the DCI and PDCCH signaling overhead. Example embodiment may enhance downlink spectral efficiency by reducing control signaling overhead and may enhance uplink radio efficiency by determining which subframes includes SRS transmission. Example embodiments enable a UE to determine the SRS subframe offset from the starting (first scheduled) MSFG subframe. The MSFG starting subframe and SRS subframe offset is dynamically signaled using DCI signaling. In this mechanism, SRS subframe is dynamically configured using DCI signaling and MSFG burst starting symbol.

In an example embodiment, a UE may not reattempt channel access to send SRS if the first SRS opportunity is unavailable. The UE may cancel the SRS trigger request if LBT indicates that the channel is unavailable. The UE may receive a new SRS trigger from the eNB and start LBT process for an SRS transmission.

Upon receiving an SRS trigger on a DCI, one or more targeted UEs may check for channel availability through configured LBT parameters for a first applicable SRS transmission opportunity, e.g. 4 subframes after receiving the trigger. Those UE's which find the channel available may proceed and send SRS. In an example, for UEs who find the channel busy, the UE may drop the configured SRS transmission until a new SRS trigger is sent by the eNB. In an example, SRS may be transmitted in an uplink MSFG burst and LBT may be performed for the uplink MSFG burst and no LBT may be required just for the SRS transmission.

In an embodiment, a single SRS may be triggered by an eNB for a partial uplink subframe following an end partial downlink subframe. Such subframes may provide opportunities for an eNB to obtain SRS feedback from one or multiple UEs who may be scheduled in uplink of the LAA cell. A UE may transmit SRS in a partial subframe even if the partial subframe do not coincide with SRS subframes if configured. Such transmission timing, which may be allowed through DCI based SRS triggers, may be in addition to those configured by RRC.

In an example embodiment, an eNB may transmit a DCI comprising an SRS request field to trigger one or more UE's SRS transmission after end of downlink end partial subframe. In one example embodiment, UE's transmitting on such partial uplink subframe may transmit SRS on the same symbol like a full subframe. In an example, given uplink subframe may have multiple M available symbols, UEs may transmit SRS on multiple symbols. This mechanism may be implemented when a UE transmits SRS on last M symbols of a partial uplink subframe e.g. with some frequency hopping between SRS transmissions. UEs may be grouped into M groups where a group transmits SRS on one of the last M symbols of uplink partial subframe.

In an example, if there are multiple SRS opportunities within duration of scheduled multi-subframe UL grant, the SRS may be transmitted once and in an earliest SRS opportunity within a duration of schedule subframes. This mechanism may allow the eNB to receive an SRS in an earliest opportunity. The eNB may process the SRS to obtain information on channel estimation and/or uplink transmission timing. The eNB may use the information for scheduling resources for downlink/uplink transmissions corresponding to a UE.

In an example, if there are multiple SRS opportunities within duration of a scheduled multi-subframe UL grant, the SRS may be transmitted once and in the latest SRS opportunity within duration of schedule subframes. This mechanism may allow the eNB to receive the SRS later (compared to the first SRS opportunity). This mechanism may provide an eNB with the most up to date information on uplink channel condition and/or uplink timing. The eNB may employ this information for subsequent uplink and/or downlink grants.

According to various embodiments, a device such as, for example, a wireless device, a base station and/or the like, may comprise one or more processors and memory. The memory may store instructions that, when executed by the one or more processors, cause the device to perform a series of actions. Embodiments of example actions are illustrated in the accompanying figures and specification.

Figure 14:
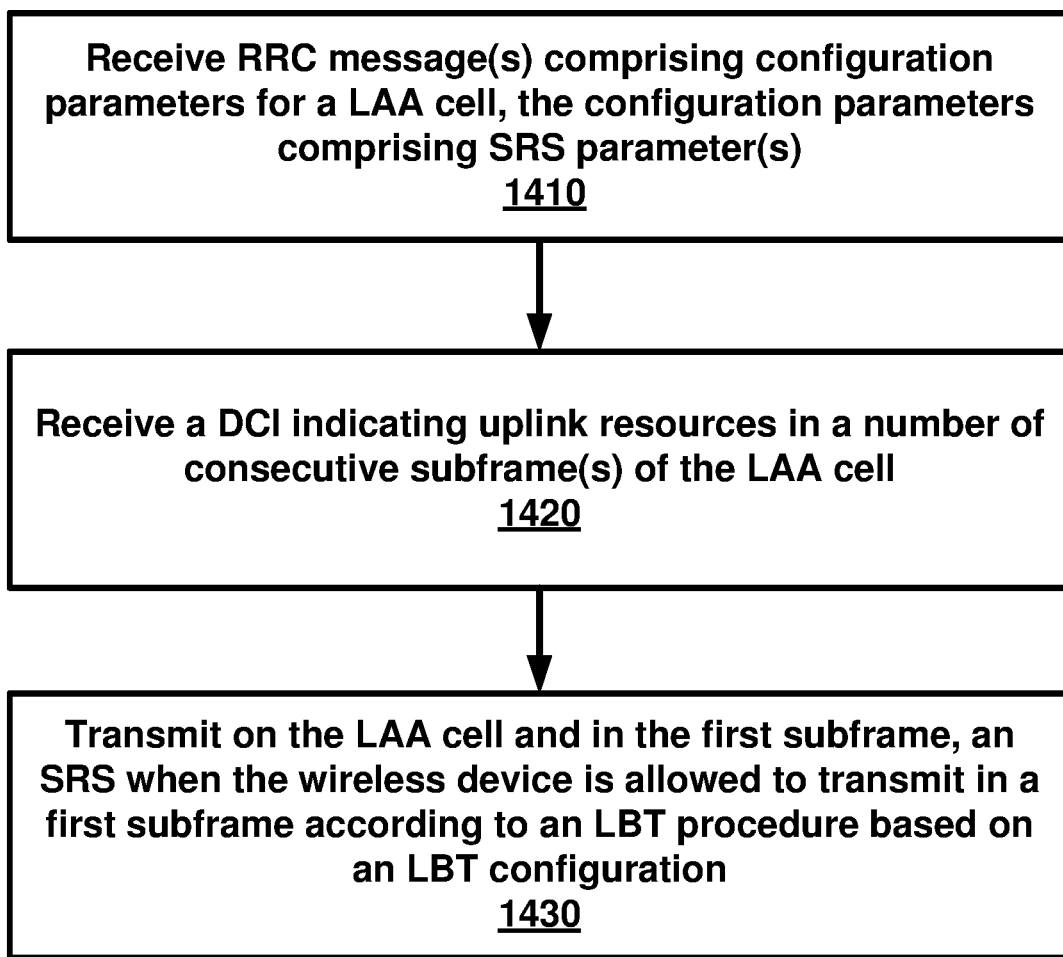
FIG. 14 is an example flow diagram illustrating as per an aspect of an embodiment of the present disclosure.

FIG. 14 is an example flow diagram as per an aspect of an embodiment of the present disclosure. At 1410, a wireless device may receive one or more radio resource control (RRC) messages comprising configuration parameters for a licensed assisted access (LAA) cell. The configuration parameters may comprise one or more sounding reference signal (SRS) parameters. At 1420, the wireless device may receive a downlink control information (DCI) indicating uplink resources in a number of one or more consecutive subframes of the LAA cell. The DCI may comprise: a first field indicating the number of the one or more consecutive subframes; a second field indicating a position of a first subframe in the one or more consecutive subframes for transmission of an SRS; and a third field indicating a listen-before-talk (LBT) configuration. At 1430, the wireless device may transmit, on the LAA cell and in the first subframe, the SRS when the wireless device is allowed to transmit in the first subframe according to an LBT procedure based on the LBT configuration.

The SRS may be transmitted, for example, in more than one symbol of the first subframe. The one or more SRS parameters may comprise, for example, an aperiodic SRS configuration parameter. The SRS may be transmitted, for example, in a last symbol of the first subframe. The second field may indicate, for example, an offset from a starting subframe of the one or more consecutive subframes. The DCI may indicate, for example, whether an SRS transmission in the one or more consecutive subframes is triggered. The one or more SRS parameters may comprise, for example, one or more common SRS parameters and one or more dedicated SRS parameters. According to an embodiment, the wireless device may further transmit one or more transport blocks in the first subframe. The SRS may be transmitted, for example, in a last symbol of the first subframe. The DCI may further comprise, for example, a transmit power control (TPC) command employed, at least in part, for calculating a transmit power for the SRS.

Figure 15:
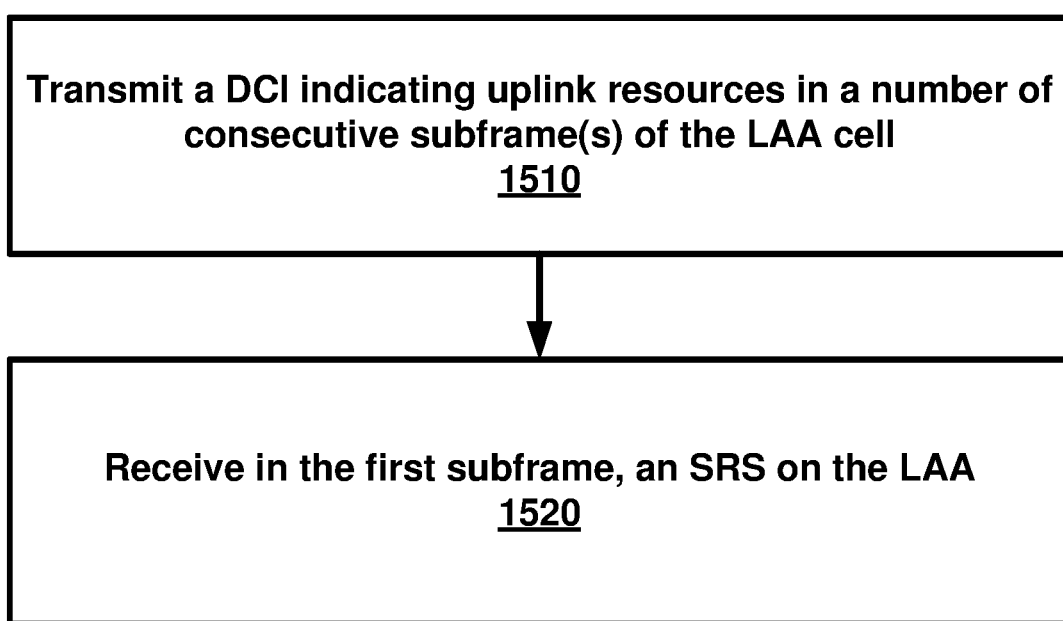
FIG. 15 is an example flow diagram illustrating an aspect of an embodiment of the present disclosure.

FIG. 15 is an example flow diagram as per an aspect of an embodiment of the present disclosure. At 1510, a base station may transmit a downlink control information (DCI) indicating uplink resources in a number of one or more consecutive subframes of a licensed assisted access (LAA) cell. The DCI may comprise: a first field indicating the number of the one or more consecutive subframes; and a second field indicating a position of a first subframe in the one or more consecutive subframes for transmission of an SRS. At 1520, the base station may receive in the first subframe, the SRS on the LAA cell. The SRS may be received, for example, in a last symbol of the first subframe.

Figure 16:
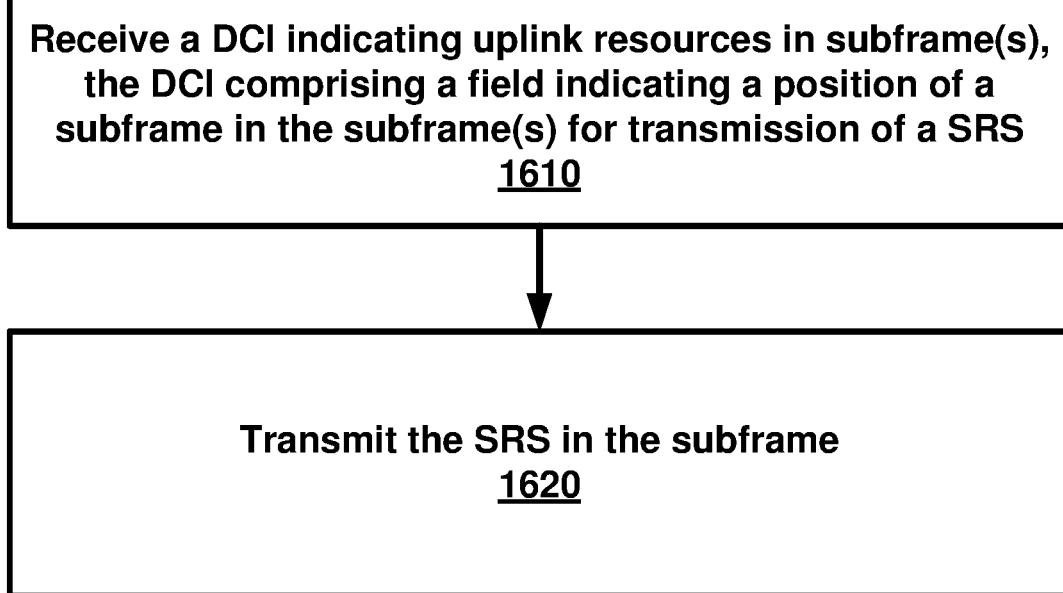
FIG. 16 is an example flow diagram illustrating an aspect of an embodiment of the present disclosure.

FIG. 16 is an example flow diagram as per an aspect of an embodiment of the present disclosure. At 1610, a wireless device may receive a downlink control information (DCI) indicating uplink resources in one or more subframes. The DCI may comprise a field indicating a position of a subframe in the one or more subframes for transmission of a sounding reference signal (SRS). At 1620, the wireless device may transmit the SRS in the subframe. The DCI may, for example, trigger a sounding reference signal (SRS) transmission. The DCI may comprise, for example, a second field indicating a number of the one or more subframes.

Figure 17:
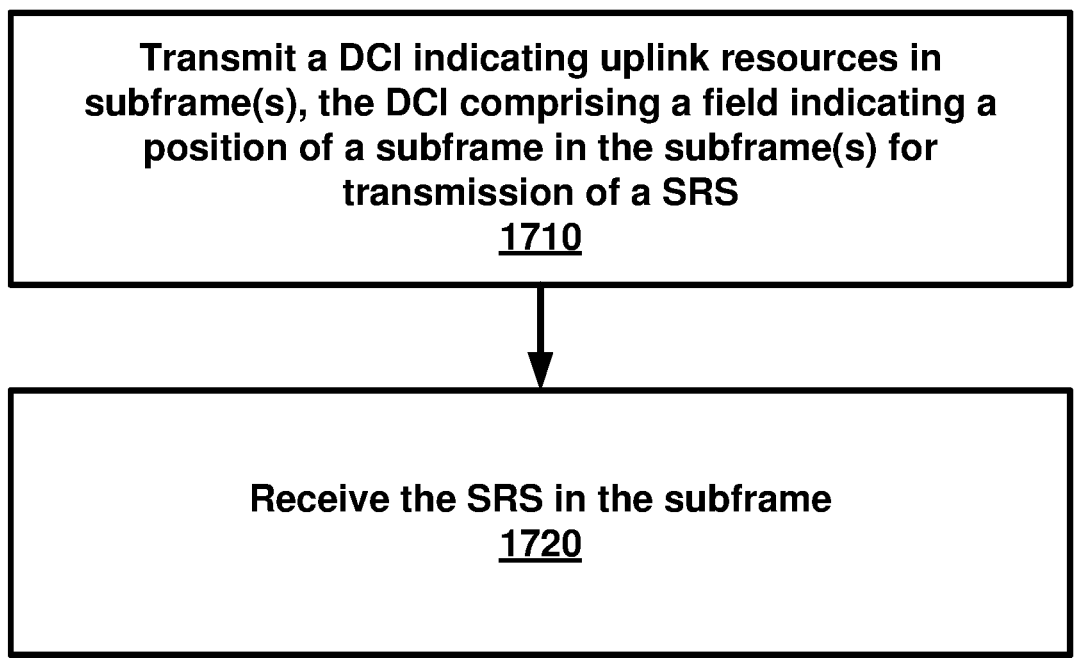
FIG. 17 is an example flow diagram illustrating an aspect of an embodiment of the present disclosure.

FIG. 17 is an example flow diagram as per an aspect of an embodiment of the present disclosure. At 1710, a base station may transmit a downlink control information (DCI) indicating uplink resources in one or more subframes. The DCI may comprise a field indicating a position of a subframe in the one or more subframes for transmission of a sounding reference signal (SRS). At 1720, the base station may receive the SRS in the subframe. The DCI may, for example, trigger a sounding reference signal (SRS) transmission. The DCI may comprise, for example, a second field indicating a number of one or more subframes.

Figure 18:
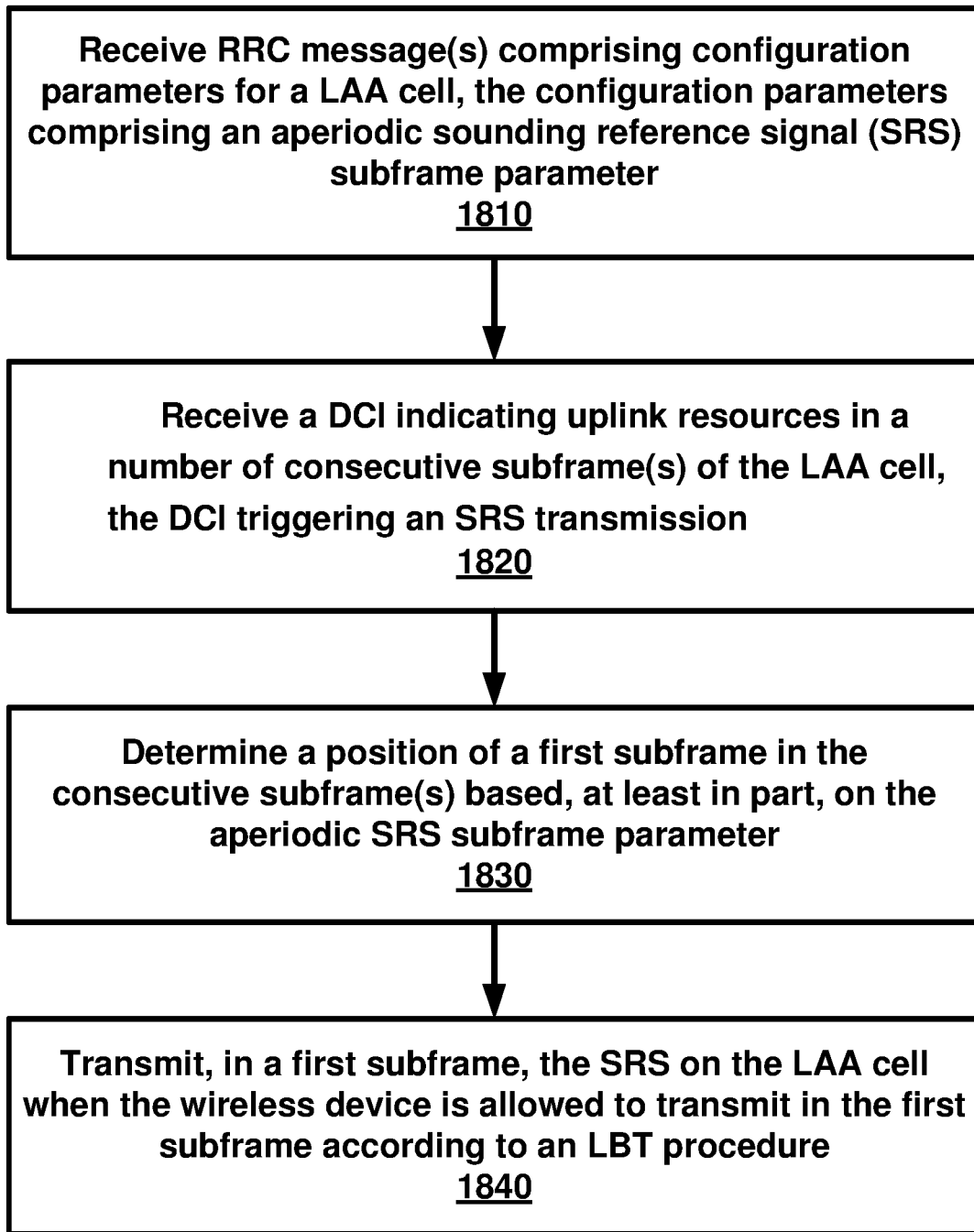
FIG. 18 is an example flow diagram illustrating an aspect of an embodiment of the present disclosure.

FIG. 18 is an example flow diagram as per an aspect of an embodiment of the present disclosure. At 1810, a wireless device may receive one or more radio resource control (RRC) messages comprising configuration parameters for a licensed assisted access (LAA) cell. The configuration parameters may comprise an aperiodic sounding reference signal (SRS) subframe parameter. At 1820, the wireless device may receive a downlink control information (DCI) indicating uplink resources in a number of one or more consecutive subframes of the LAA cell. The DCI may trigger an SRS transmission and may comprise: the number of the one or more consecutive subframes; and a listen-before-talk (LBT) configuration. At 1830, the wireless device may determine a position of a first subframe in the one or more consecutive subframes based, at least in part, on the aperiodic SRS subframe parameter. At 1840, the wireless device may transmit, in the first subframe, the SRS on the LAA cell when the wireless device is allowed to transmit in the first subframe according to an LBT procedure based on the LBT configuration.

The SRS may be transmitted, for example, in more than one symbol of the first subframe. The DCI may further comprise, for example, a field indicating whether the SRS transmission is triggered. The SRS may be transmitted, for example, in a last symbol of the first subframe. The aperiodic SRS subframe parameter may indicate, for example, an offset from a starting subframe of the one or more consecutive subframes. The LBT configuration may indicate, for example, that a symbol time interval is employed for the LBT procedure. The configuration parameters may comprise, for example, one or more common SRS parameters and one or more dedicated SRS parameters. The wireless device may further transmit, for example, one or more transport blocks in the first subframe. The configuration parameters may comprise, for example, an SRS bandwidth. The DCI may further comprise, for example, a transmit power control (TPC) command employed, at least in part, for calculating a transmit power for the SRS.

Figure 19:
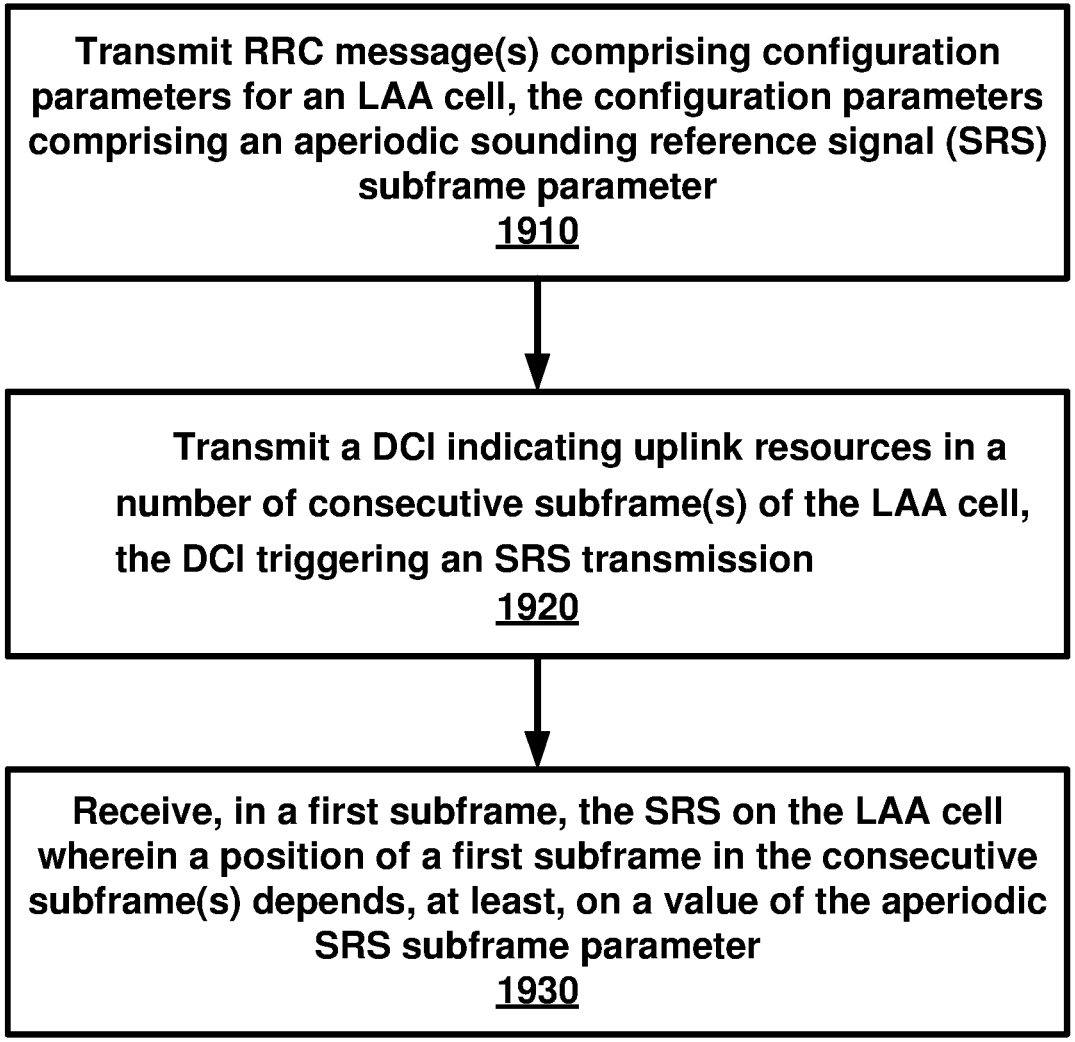
FIG. 19 is an example flow diagram illustrating an aspect of an embodiment of the present disclosure.

FIG. 19 is an example flow diagram as per an aspect of an embodiment of the present disclosure. At 1910, a base station may transmit one or more radio resource control (RRC) messages comprising configuration parameters for a licensed assisted access (LAA) cell. The configuration parameters may comprise an aperiodic sounding reference signal (SRS) subframe parameter. At 1920, the base station may transmit a downlink control information (DCI) indicating uplink resources in a number of one or more consecutive subframes of the LAA cell. The DCI may trigger an SRS transmission and may comprise a field indicating the number of the one or more consecutive subframes. At 1930, the base station may receive, in the first subframe, the SRS on the LAA cell wherein a position of a first subframe in the one or more consecutive subframes depends, at least, on a value of the aperiodic SRS subframe parameter. The DCI may further comprise, for example, a transmit power control (TPC) command employed, at least in part, for calculating a transmit power for the SRS.

Figure 20:
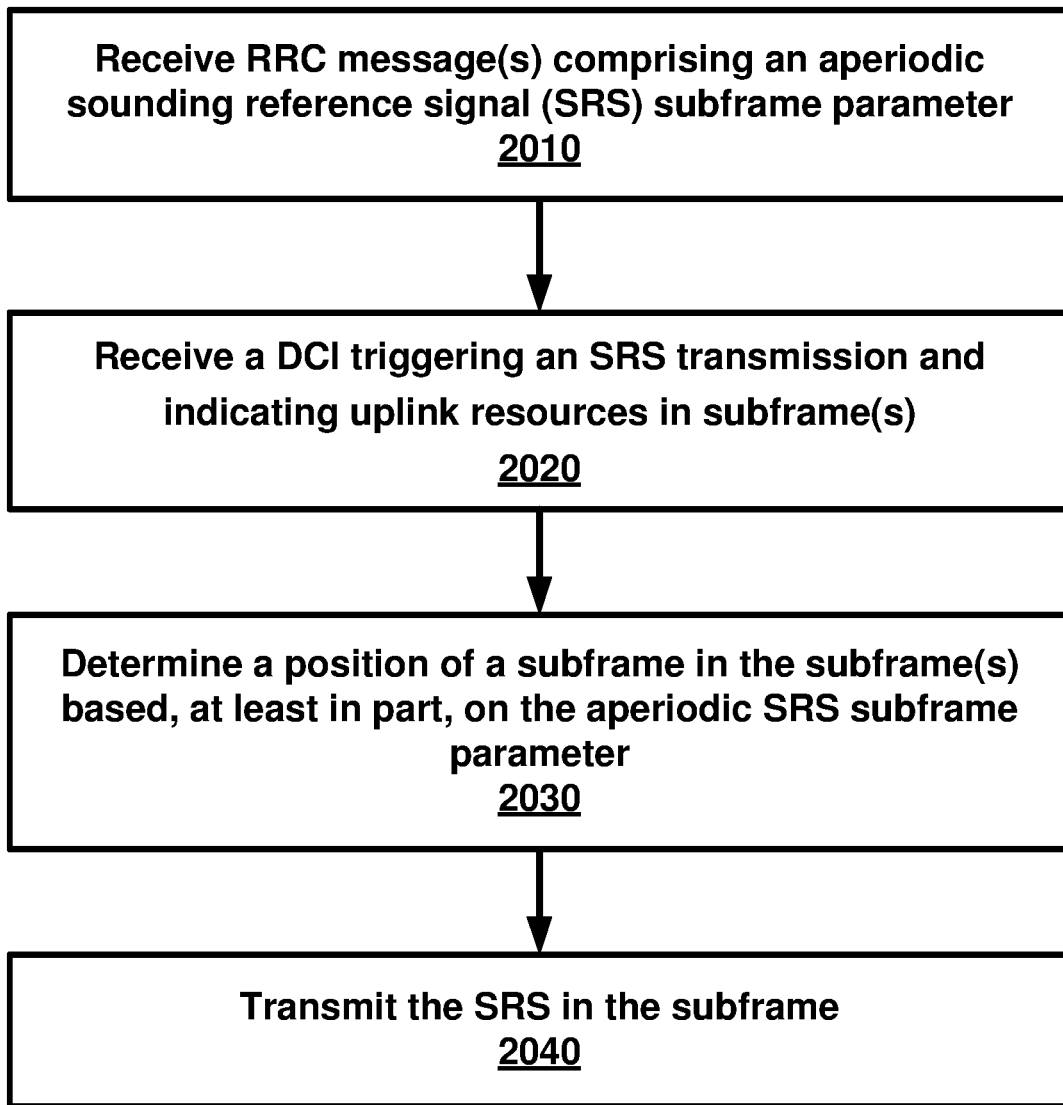
FIG. 20 is an example flow diagram illustrating an aspect of an embodiment of the present disclosure.

FIG. 20 is an example flow diagram as per an aspect of an embodiment of the present disclosure. At 2010, a wireless device may receive one or more RRC messages comprising an aperiodic SRS subframe parameter. At 2020, the wireless device may receive a DCI triggering an SRS transmission and indicating uplink resources in one or more subframes. At 2030, the wireless device may determine a position of a subframe in the one or more subframes based, at least in part, on the aperiodic SRS subframe parameter. At 2040, the wireless device may transmit the SRS in the subframe. The RRC message may comprise, for example, configuration parameters for a LAA cell. The DCI may comprise, for example, a field indicating the number of the one or more subframes.

Figure 21:
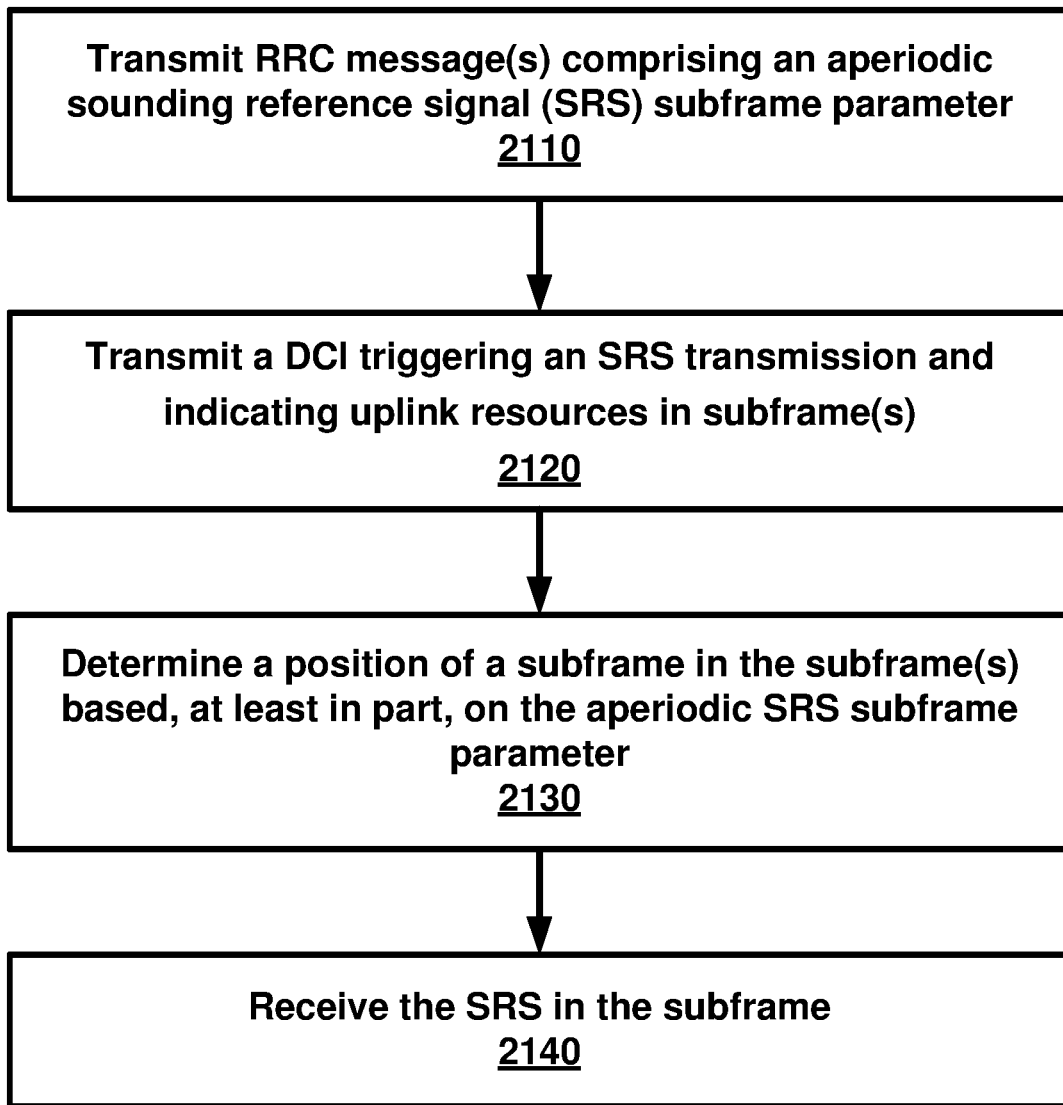
FIG. 21 is an example flow diagram illustrating an aspect of an embodiment of the present disclosure.

FIG. 21 is an example flow diagram as per an aspect of an embodiment of the present disclosure. At 2110, a base station may transmit one or more RRC messages comprising an aperiodic SRS subframe parameter. At 2120, the base station may transmit a DCI triggering an SRS transmission and indicating uplink resources in one or more subframes. At 2130, the base station may determine a position of a subframe in the one or more subframes based, at least in part, on the aperiodic SRS subframe parameter. At 2140, the base station may receive the SRS in the subframe. The RRC message may comprise, for example, configuration parameters for a LAA cell. The DCI may comprise, for example, a field indicating the number of the one or more subframes.

Figure 22:
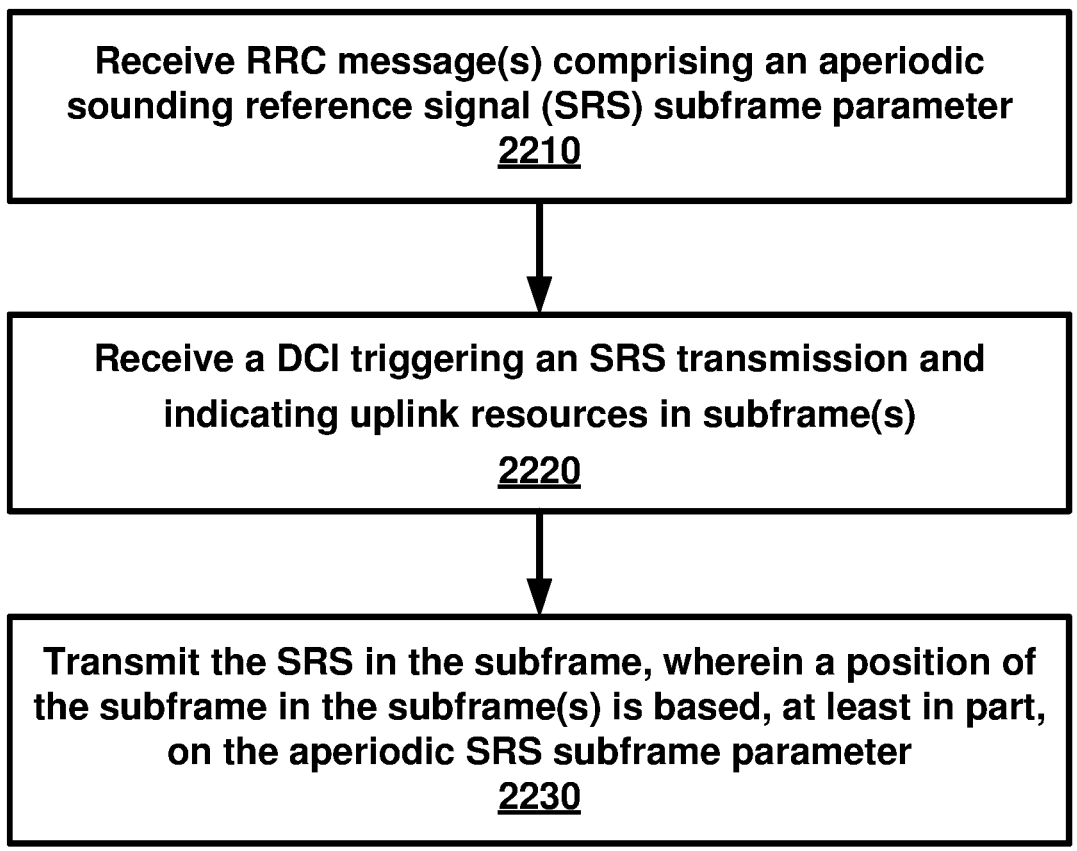
FIG. 22 is an example flow diagram illustrating an aspect of an embodiment of the present disclosure.

FIG. 22 is an example flow diagram as per an aspect of an embodiment of the present disclosure. At 2210, a wireless device may receive one or more RRC messages comprising an aperiodic SRS subframe parameter. At 2220, the wireless device may receive a DCI triggering an SRS transmission and indicating uplink resources in one or more subframes. At 2230, the wireless device may transmit the SRS in the subframe, wherein a position of the subframe in the one or more subframes is based, at least in part, on the aperiodic SRS subframe parameter.

Figure 23:
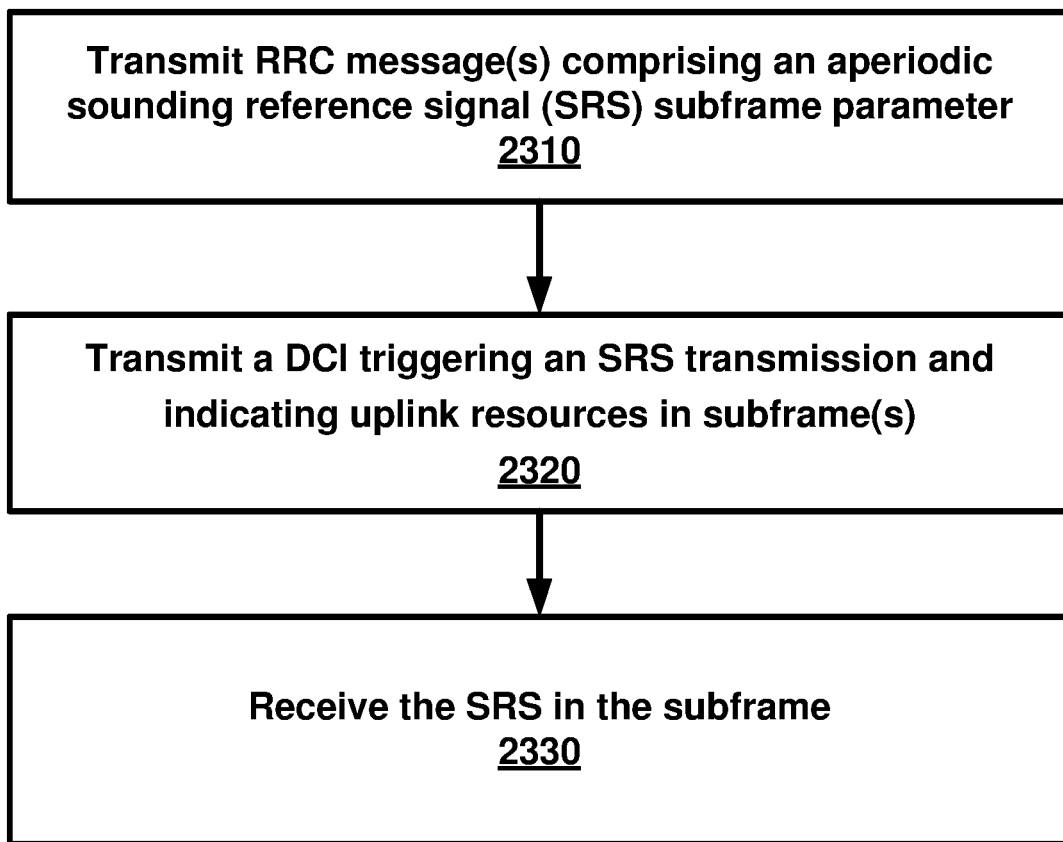
FIG. 23 is an example flow diagram illustrating an aspect of an embodiment of the present disclosure.

FIG. 23 is an example flow diagram as per an aspect of an embodiment of the present disclosure. At 2310, a base station may transmit one or more RRC messages comprising an aperiodic SRS subframe parameter. At 2320, the base station may transmit a DCI triggering an SRS transmission and indicating uplink resources in one or more subframes. At 2330, the base station may receive the SRS in the subframe. A position of the subframe in the one or more subframes is determined based, at least in part, on the aperiodic SRS subframe parameter.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the disclosure may also be implemented in a system comprising one or more TDD cells (e.g. frame structure 2 and/or frame structure 3-licensed assisted access). The disclosed methods and systems may be implemented in wireless or wireline systems. The features of various embodiments presented in this disclosure may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
receiving, by a wireless device, one or more radio resource control messages comprising an aperiodic sounding reference signal (SRS) subframe parameter;
receiving a downlink control information indicating uplink resources in consecutive subframes for transmission of transport blocks by the wireless device, the downlink control information triggering a transmission of an SRS and comprising a listen-before-talk (LBT) configuration for an LBT procedure;
determining a position of a subframe, for the transmission of the SRS, in the consecutive subframes based on the aperiodic SRS subframe parameter; and
transmitting, via the subframe, the SRS based on the LBT procedure indicating a clear channel.

2. The method of claim 1, wherein the SRS is transmitted in more than one symbol of the subframe.

3. The method of claim 1, wherein the downlink control information further comprises a field indicating whether the transmission of the SRS is triggered.

4. The method of claim 1, wherein the SRS is transmitted in a last symbol of the subframe.

5. The method of claim 1, wherein the aperiodic SRS subframe parameter indicates an offset from a starting subframe of the consecutive subframes.

6. The method of claim 1, wherein the LBT configuration indicates a symbol time interval is employed for the LBT procedure.

7. The method of claim 1, wherein the one or more radio resource control messages further comprise one or more common SRS parameters and one or more dedicated SRS parameters.

8. The method of claim 1, further comprising transmitting one or more transport blocks in the subframe.

9. The method of claim 1, wherein the one or more RRC messages further comprise an SRS bandwidth.

10. The method of claim 1, wherein the downlink control information further comprises a transmit power control command employed, at least in part, for calculating a transmit power for the SRS.

11. A wireless device comprising:
one or more processors; and
memory storing instructions that, when executed by the one or more processors, cause the wireless device to:
receive one or more radio resource control messages comprising an aperiodic sounding reference signal (SRS) subframe parameter;
receive a downlink control information indicating uplink resources in consecutive subframes for transmission of transport blocks by the wireless device, the downlink control information triggering a transmission of an SRS and comprising a listen-before-talk (LBT) configuration for an LBT procedure;
determine a position of a subframe, for the transmission of the SRS, in the consecutive subframes based on the aperiodic SRS subframe parameter; and
transmit, via the subframe, the SRS based on the LBT procedure indicating a clear channel.

12. The wireless device of claim 11, wherein the SRS is transmitted in more than one symbol of the subframe.

13. The wireless device of claim 11, wherein the downlink control information further comprises a field indicating whether the transmission of the SRS is triggered.

14. The wireless device of claim 11, wherein the SRS is transmitted in a last symbol of the subframe.

15. The wireless device of claim 11, wherein the aperiodic SRS subframe parameter indicates an offset from a starting subframe of the consecutive subframes.

16. The wireless device of claim 11, wherein the LBT configuration indicates a symbol time interval is employed for the LBT procedure.

17. The wireless device of claim 11, wherein the one or more radio resource control messages further comprise one or more common SRS parameters and one or more dedicated SRS parameters.

18. The wireless device of claim 11, wherein the instructions, when executed by the one or more processors, further cause the wireless device to transmit one or more transport blocks in the subframe.

19. The wireless device of claim 11, wherein the one or more RRC messages further comprise an SRS bandwidth.

20. The wireless device of claim 11, wherein the downlink control information further comprises a transmit power control command employed, at least in part, for calculating a transmit power for the SRS.

* * * * *